United States Patent [19]

Ishikawa et al.

[11] Patent Number: 6,057,021
[45] Date of Patent: *May 2, 2000

[54] MAGNETIC RECORDING MEDIA AND MAGNETIC RECORDING SYSTEM USING THE SAME

[75] Inventors: Akira Ishikawa, Menlo Park, Calif.; Yuzuru Hosoe, Hino, Japan; Yoshihiro Shiroishi, Hachioji, Japan; Masatoshi Takeshita, Iruma, Japan; Yotsuo Yahisa, Kokubunji, Japan; Tomoo Yamamoto, Hachioji, Japan; Akira Osaki, Odawara, Japan; Kiwamu Tanahashi, Musashino, Japan; Jun Fumioka, Hadano, Japan; Yoshiki Kato, Tokyo, Japan; Masaki Ohura, Odawara, Japan; Yukio Katoh, Kokunbunji, Japan

[73] Assignee: Hitachi, Ltd., Tokyo, Japan

[*] Notice: This patent is subject to a terminal disclaimer.

[21] Appl. No.: 08/944,472

[22] Filed: Oct. 6, 1997

Related U.S. Application Data

[63] Continuation of application No. 08/155,515, Nov. 22, 1993, Pat. No. 5,750,230.

[30] Foreign Application Priority Data

Nov. 20, 1992 [JP] Japan .................................. 4-310652
Dec. 18, 1992 [JP] Japan .................................. 4-338323
Feb. 18, 1993 [JP] Japan .................................. 5-029371

[51] Int. Cl.$^7$ .................................................... G11B 5/60
[52] U.S. Cl. ...................... 428/65.3; 428/65.5; 428/141; 428/336; 428/684 T; 428/694 TS; 428/694 TM; 428/694 TR; 428/694 TP; 428/900; 360/113; 360/128; 360/135
[58] Field of Search ......................... 428/694 T, 694 TS, 428/694 TM, 694 TR, 694 TF, 141, 356, 653, 65.5, 900; 360/113, 128, 135

[56] References Cited

U.S. PATENT DOCUMENTS 5,750,230   5/1998   Ishikawa ............................... 428/65.3

*Primary Examiner*—Leszek Kiliman
*Attorney, Agent, or Firm*—Antonelli, Terry, Stout & Kraus, LLP

[57] ABSTRACT

In a magnetic recording medium having a non-magnetic disk substrate and a magnetic film formed on the surface of the non-magnetic disk substrate, a surface average roughness factor Ra(r) on the surface of the medium being from 0.3 nm to 3 nm, an orientation ratio of coercivity being from 0.1 to 0.7, and an in-plane magnetic anisotropic energy being from $3\times10^4$ J/m$^3$ to $5\times10^5$ J/m$^3$. By using such a medium, it is possible to provide a magnetic recording apparatus in which the magnetic head is capable of flying in a low position and high-density recording is achieved.

7 Claims, 9 Drawing Sheets

MAGNETIC RECORDING MEDIA AND MAGNETIC RECORDING SYSTEM USING THE SAME

This is a continuation of application Ser. No. 08/155,515, filed Nov. 22, 1993 now U.S. Pat. No. 5,750,230.

BACKGROUND OF THE INVENTION

Field of the Invention

The present invention relates to a magnetic recording media, such as magnetic recording tapes, magnetic recording disks, or magnetic recording cards, and to a magnetic recording system. More particularly, the present invention relates to thin-film media suitable for high density magnetic recording and a magnetic recording system using the media.

As electric computers have become smaller and the speed thereof has been increased, there has been a great demand for higher capacity magnetic disk apparatuses and other external storage apparatuses and higher access thereto. In particular, magnetic disk recording apparatuses are information recording apparatuses suited for higher density and higher speed, and the demand for these apparatuses is getting even higher. As for recording media used in magnetic disk apparatuses, media with magnetic oxide powders coated on the substrate, and thin-film media having thin films of magnetic metals sputtered on the substrate have been developed. This thin film media, as disclosed in, for example, Japanese Patent Laid-Open Nos. 58-7806 and 60-111323, have a higher content of magnetic material in the magnetic recording layer than that of coated media, and therefore it is suitable for recording and reproduction at high density.

A magnetoresistive (hereinafter abbreviated as MR) head having improved read sensitivity over that of a conventional inductive head has been developed by using an MR sensor in the reproduction section of the magnetic head, as disclosed in for example, Japanese Patent Laid-Open Nos. 62-40610 and 63-117309. Since a satisfactory S/N ratio can be obtained even if the area of recording bits is small when this head is used, it is possible to remarkably improve the recording density of media.

Aluminum alloys, glass, ceramics or organic resins are used for substrates of thin film media. An Ni—P-plated layer or an anodic oxide film, having a thickness of, for example, approximately 10 μm, is formed on the surface of a disk substrate in order to improve molding characteristics such as hardness or flatness, or magnetic characteristics. On the surface of the substrate of the media, there are formed very small grooves, as disclosed in U.S. Pat. No. 4,735,840, Japanese Patent Laid-Open Nos. 61-29418, 62-146434, and 63-121123, the Journal IEEE Trans. Magn., Vol. MAG-22 (5), p. 579, 1966, or IEEE Trans. Magn., Vol. MAG-23 (5), p. 3405, 1987, substantially in the recording direction, for example, substantially circumferentially for the disk media. The grooves, called texture, are formed by cutting the surface nearly circumferentially with abrasive grains. Hitherto, the average roughness factor (Ra) of the groove was in a range from approximately 2 nm to 10 nm. When such texture is formed, the frictional force of the magnetic head contacting the media decreases, so that the problem of the head adhering to the surface of the media during a contact start/stop (hereinafter abbreviated as CSS) operation is aboided. Further, if the average roughness factor of the groove, the thickness of an underlayer, or film forming conditions of the media are changed appropriately, the magnetic characteristics of magnetic films measured by applying a magnetic field in the recording direction, for example, coercivity Hc, a residual magnetic susceptibility Br, coercive squareness S*, or magnetic anisotropic energy K measured by applying a magnetic field within the surface of the substrate while rotating a specimen within the surface of the substrate, are more improved than when no texture is formed, and the signal to noise ratio (S/N ratio) of the read output and resolution are improved. Further, there is a problem called modulation in which nearly circumferential magnetic characteristics becoming nonuniform within the surface of the media depending upon the heating temperature during the formation of the media and upon the transfer method, causing a read output to vary within the surface of the media. However, if the depth of the groove, the composition of the underlayer, or the film forming conditions are changed appropriately, nearly circumferential magnetic characteristics are made uniform within the surface of the media. As a result, modulation is suppressed. The above effect has been observed.

FIG. 1 is a longitudinal, sectional view of a thin-film magnetic recording medium, illustrating the relationship between the medium and the MR head. In FIG. 1 reference numeral 11 denotes a magnetic head, reference numeral 17 denotes a substrate formed from Al—Mg alloy, and reference numeral 15 denotes non-magnetic plated layers formed from Ni—P, whose surface was textured to form grooves 16. Reference numerals 14, 13 and 12 denote a underlayer, a magnetic layer and a protective layer formed on the textured Ni—P plated layer.

To improve the recording density of a thin film medium, it is important to make the spacing (hereinafter abbreviated as the head flying height) between the magnetic head and the recording medium as small as possible. This is because a sharp magnetic-field distribution is formed within the media during recording, and magnetic fluxes from the medium can be efficiently detected during reading, thereby suppressing a loss in the read output. However, if the head flying height is decreased in a textured medium, the incidence of the contacting of the magnetic head with the medium increases more than that of a flat substrate having no texture. A detailed examination shows that the cause for the above is that irregular, very small projections are unavoidably formed on the surface of the medium as the result of texturing, and if the head flying height is decreased, the projections contact the magnetic head. A method of removing projections on the surface of the substrate by a polishing process, to reduce the incidence in which the head contacts the medium, is disclosed in Japanese Patent Laid-Open No. 1-162229. However, this method has the problem that the magnetic characteristics and anisotropic energy of the magnetic film measured by applying a magnetic field in the recording direction less than before the projections are polished, the S/N ratio decreases, and modulation is caused.

There is another problem in that, when the depth of the groove is great, the uniformity and S/N of servo signals which have been recorded previously in the medium, necessary for the head to follow tracks in which information is recorded, are worse than in a flat substrate with no texture, making it impossible to increase the density of the tracks.

Making the depth of the groove small is effective to solve the problem of head flying characteristics and deterioration of servo signals. However, as described in the Journal IEEE Trans. Magn., Vol. MAG-23 (5), p. 3405, 1987, if the depth of the groove decreased, the problem arises that the magnetic characteristics of the magnetic film measured by applying a magnetic field in the recording direction. Here, the orientation ratio of coercivity Hc in the recording direction is defined as $\{Hc(\theta)-Hc(r)\}/\{Hc(\theta)+Hc(r)\}$ on the basis of coercivity $Hc(\theta)$ measured by applying a magnetic field in the recording direction along the recording truck, and coercivity $Hc(r)$ measured by applying a magnetic field, within the surface of the media, substantially perpendicularly to the recording direction across the recording truck.

The above-described orientation ratio of Hc is closely related to the recording and reproduction characteristics of the medium. The results of detailed experiments show that the orientation ratio is preferably positive (greater than 0) to obtain S/N ratio of read output of 3 or more, and more preferably 0.1 to 0.7 to obtain S/N of 4 or more when the linear recording density is 50 k BPI (Bits Per Inch) and the track density is 3 k TPI (Tracks Per Inch). Also, it has been shown that in-plane magnetic anisotropic energy measured by rotating a specimen within the surface of the media while applying a magnetic field parallel to the surface of the media is preferably $3\times10^4$ J/m$^3$ to $5\times10^5$ J/m$^3$. However, in the conventional art, decreasing the size of the groove in order to control the orientation ratio of coercivity Hc within the above-described range has not been known hitherto, and the average roughness factor of the groove needs to be greater than 3 nm.

SUMMARY OF THE INVENTION

In view of the above-described problems and circumstances, it is a first object of the present invention to provide a medium which has satisfactory magnetic characteristics along the recording direction, which makes it possible for a head to fly stably, which has a high S/N ratio during recording at high density. More specifically, the object is to provide a medium whose number of bit errors 10 bits or less per plane and the modulation of the media is not mere than 10%, after a test of 50,000 head seeks from the inner circumference to the outer circumference when the flying height of the head is 0.1 $\mu$m or less is, and in the media the value of the S/N ratio of reproduced output are not less than 4 when the linear recording density is 50 k BPI and when the track density is 3 k TPI. It is a second object of the present invention to provide a method of manufacturing such media with a high degree of reproducibility. It is a third object of the present invention to provide a highly reliable magnetic recording apparatus having a large capacity, which uses such media.

The inventors of the present invention conducted thorough research on the relationships between the microscopic features on the surface of the medium, the magnetic characteristics measured by applying a magnetic field along the recording direction, in-plane magnetic anisotropic energy, read/write characteristics, head flying characteristics. They found that the above-described objects could be achieved by providing very small recesses and projections on the surface of the medium along the recording direction, making it possible to provide a medium having excellent magnetic characteristics measured by applying a magnetic field along the recording direction, in-plane magnetic anisotropic energy and stable head flying characteristics. More specifically, it has been found that a medium can be provided such that the range of the average roughness factor $Ra(r)$ on the surface of the medium measured substantially perpendicularly to the recording direction is from 0.3 nm to 3 nm, and the orientation ratio of the above-described coercivity Hc is 0.1 to 0.7. It has also been found that a medium cab be provided such that the range of the average roughness factor $Ra(r)$ on the surface of the medium measured substantially perpendicularly to the recording direction is from 0.3 nm to 3 nm, and which has an easy magnetization axis along the recording direction; and in-plane magnetic anisotropic energy measured by rotating a specimen within the surface of the media while applying a magnetic field parallel to the surface of the media is $3\times10^4$ J/m$^3$ to $5\times10^5$ J/m$^3$. Under this circumstance, it is preferable that the average number of grooves present on the surface of the medium per 1 $\mu$m substantially perpendicular to the recording direction and having a depth of 1 nm or more be from 0.5 to 100. The ratio of the maximum height of the surface of the medium to $Ra(r)$, $Rmax(r)/Ra(r)$, is preferably from 10 to 30. The ratio of the average roughness factor measured substantially along the recording direction, $Ra(\theta)$, to the average roughness factor $Ra(r)$ measured substantially perpendicularly to the recording direction $Ra(r)/Ra(\theta)$ is preferably from 1.1 to 3.0.

Here, the use of "average roughness factor" and "maximum height" conforms to the standards defined in Japanese Industrial Standards (JIS-B0601). The average roughness factor and the maximum height can be measured by a needle touch-type or optical surface profiler, a scanning tunnel microscope, an atomic force microscope, an electron beam three-dimensional roughness measuring apparatus, or a transmission electron microscope. To obtain measurements with satisfactory reproducibility when a needle tough-type surface profiler is used, the size of the tip of the touch-type needle shown in FIG. 2 (denoted by numeral 20) should be 0.5 $\mu$m or less, and preferably 0.2 $\mu$m or less, the pressing-down load of the touch-type needle be 4 mg or less, the touch-type needle scanning speed be 1 $\mu$m/s or less, and cutoff be 0.5 $\mu$m to 5 $\mu$m. When a part of a protective film has been processed by etching, heating or the like, the shape of the groove can be measured by scanning the surface of the unprocessed portions (denoted by numeral 28 in FIG. 2) with the touch-type needle as shown in FIG. 2. When the entire surface of the protective film has been processed, it is preferable that only the protective layer be removed by etching and then the roughness on the surface of the magnetic film be measured.

If an underlayer made of Cr, Mo, W or an alloy having these as principal constituents is formed into a thickness of 5 to 500 nm on the substrate, and if a crystal is grown to be orientated so that the (100) or (110) crystal lattice plane of the underlayer becomes parallel to the substrate, the magnetic anisotropy along the recording direction can be improved, which is preferable. Co, Fe, Ni or an alloy having these as principal constituents are preferable for a magnetic layer, and satisfactory magnetic characteristics can be observed, particularly when an alloy of Co—Ni, Co—Cr, Co—Fe, Co—Mo, Co—W, Co—Pt, Co—Re or the like are used as main constituents for a magnetic layer. If the crystal is grown to be oriented so that the (110) crystal lattice plane of the magnetic layer becomes substantially parallel to the substrate, the magnetic anisotropy is improved, which is advantageous. When excellent resistance to corrosion and excellent magnetic properties are needed, an alloy having Cr, Mo or W as principal constituents for the underlayer, in which at least one of Nb, Ti, Ta, Pt, Pd, Si, Fe, V or P is added, is preferably used, and an alloy having Co—Ni—Zr, Co—Cr—Pt, Co—Cr—Ta, or Co—Ni—Cr as principal constituents for a magnetic member which forms a magnetic film is preferably used. If the magnetic film is multi-layered to two or more layers by using non-magnetic intermediate layers having at least one of Cr, Mo, W, V, Ta, Nb, Zr, Ti, B, Be, C, or Ni—P, as principal constituents, noise generated from the medium is reduced, which is preferable. If carbon is formed to a thickness of 10 to 50 nm as a protective layer for the magnetic film, and if a lubricant layer of adsorptive perfluoroalkyl-polyether or the like is provided to a thickness of 3 to 20 nm, a highly reliable magnetic recording medium in which high density recording is possible can be obtained. If carbide such as WC or (W—Mo)C, nitride such as (Zr—Nb)—N or $Si_3N_4$, oxide such as $SiO_2$ or $ZrO_2$, or B, BsC, $MOS_2$, Rh or the like is used as the protective layer, resistance to sliding and resistance to corrosion can be improved, which is preferable. In particular, the area of contact between the head and the medium cab be reduced by plasma-etching these protective films through a fine mask after film formation so as to form very small recesses and projections on the surface thereof, or by causing projections to occur on the surface of the protective films by using a target material of a compound and a mixture, or by forming recesses and projections on the surface thereof by heat treatment, with the result that the problem of the head adhering to the surface of the medium during to CSS operation can be preferably avoided.

When forming the above-described magnetic recording medium, after forming grooves by polishing the non-magnetic substrate having an average roughness factor Ra of 2 nm or less substantially, along the recording direction by using a polishing member containing polishing abrasive grains having an average particle size of 1 μm or less, and preferably not more than 0.5 μm, a magnetic layer and a protective layer are formed directly or via the underlayer by physical deposition means so that the range average roughness factor Ra(r) measured substantially perpendicularly to the recording direction is made 0.3 nm to 3 nm, with the result that the number of bit errors when the flying level of the head is 0.1 μm or less can be preferably reduced.

Another method of forming the above-described magnetic recording medium will now be described. After forming grooves as shown in FIG. 2 by polishing an underlayer, formed on a non-magnetic substrate with an average roughness factor Ra of 2 nm or less, substantially along the recording direction by using a polishing member containing polishing abrasive grains having an average particle size of 1 μm or less, preferably not more than 0.5 μm, it is possible to form a magnetic layer and a protective layer by physical deposition means so that the range of average roughness factor Ra(r) measured substantially perpendicularly to the recording direction is 0.3 nm to 3 nm. Under this circumstance, it is important to control the polishing time using grain powders most appropriately without excessively shortening or prolonging the period of time. It is also effective to form the grooves so that they cross each other. With this arrangement, it is possible to make the average number of grooves present on the surface of the medium per 1 μm substantially perpendicular to the recording direction and having a depth of 1 nm or more be from 0.5 to 100. Also, it is possible to make the range of the value of Rmax(r)/Ra(r) be 10 to 30. Also, it is possible to make the range of the value of Ra(r)/Ra(θ) be 1.1 to 3.0. Based on these effects, the orientation ratio of Hc and in-plane magnetic anisotropic energy are improved.

In this magnetic recording medium, since the fluctuation of a servo signal caused by the recesses and projections on the surface of the magnetic film is very small, and the medium is of high quality, head positioning accuracy is improved. Also, by combining with the MR head with a track width of 5 μm or less, a highly reliable, a high-capacity magnetic recording apparatus can be provided in which the linear recording density of the medium is 50 k BPI or more and the recording track density is 3 k TPI or more.

The inventors of the present invention used a liquid or tape-shaped processing material containing diamond, alumina or ceria abrasive grains having and average grain size of 0.1 to 10 μm, so as to provide very small grooves in the recording direction by polishing a non-magnetic substrate such as an Ni—P plated Al alloy, glass, Ti, Si, carbon, $ZrO_2$ or the like, having a surface average roughness factor of approximately 1 nm or less, while varying polishing conditions such as a polishing pressure, a period of time, a polishing method or the like. A magnetic film, a protective lubricant film or the like are formed on these grooves directly or via an underlayer. Then, flying properties, magnetic characteristics (read/write) characteristics were examined. Also, a Cr underlayer is formed on the non-magnetic substrate whose surface average roughness factor Ra is approximately 1 nm. Very small grooves are provided in the recording direction by polishing the surface of the underlayer under the above-described polishing conditions, and a magnetic film and a protective film and a lubricant film are formed on the underlayer. Then, the head flying properties, magnetic characteristics, read/write characteristics or the like were examined. Although, in the conventional art, Ra of the groove must be set at a large value exceeding 3 nm to increase circumferential magnetic anisotropy even if the head flying properties are deteriorated, the inventors of the present invention found that, completely unlike such above commonly accepted idea, even if the coarseness of grooves which are provided on the surface of the magnetic film is decreased, it is possible to ensure excellent magnetic anisotropy in the recording direction, and it is possible to provide a medium having highly excellent flying properties. This is based on the effect described below. If the average grain size of processing abrasive grains is made 1 μm or less, and preferably not more than 0.5 μm, and if Ra(r) of the surface of the magnetic film is controlled on the basis of the abrasive grains processing time and the abrasive grains processing pressure, the orientation ratio of the coercivity along the recording direction is improved to 0.1 to 0.7 when 0.3 nm≦Ra≦3 nm, as shown in FIG. 3. When Ra exceeds 3 nm, the magnetic anisotropy in the recording direction and the head flying properties are deteriorated. The reason why a high coercivity orientation ratio can be obtained even in the medium in which very small grooves of slight coarseness are formed is that the cutting performance of abrasive grains during polishing is best in the initial period of processing, and the density of the grooves is high. When a flat substrate whose average roughness factor is 1 nm is textured, as shown in FIG. 4, Ra(r) measured substantially perpendicular to the recording direction increases markedly with an increase in the processing time, but the variations in the surface roughness factor Ra(θ) in the recording direction are more sluggish than those of Ra(r). The abrasive grains polish most effectively in the initial processing period of time where Ra(r) varies sharply as described above, and during this time satisfactory high-density grooves of the size of approximately crystal grains are formed. In this way, it is possible to make the average number of grooves present on the surface of the medium per 1 μm substantially perpendicular to the recording direction and having a depth of 1 nm or more, be from 0.5 to 100. Also, it is possible to make the range of the value of Rmax(r)/Ra(r) be from 10 to 30. Also, it is possible to make the range of the value of Ra(r)/Ra(θ) be from 1.1 to 3.0. Based on these effects, the orientation ratio of Hc and in-plane magnetic anisotropic energy are improved. If the processing time is prolonged by using abrasive grains of a large size as in the conventional art, abnormal projections and burrs appear on the surface of the medium, causing the head flying properties to deteriorate and causing the orientation ratio of Hc and the in-plane magnetic anisotropic energy to decrease.

If the crystal is grown to be oriented in such a way that the (110) crystal lattice plane of the magnetic layer becomes substantially parallel to the substrate, the orientation ratio along the recording direction is improved and the in-plane magnetic anisotropic energy is increased. Furthermore, if the crystal is grown to be oriented in such a way that the (100) or (110) crystal lattice plane of the magnetic layer becomes substantially parallel to the substrate, the oriented growth of the magnetic film is promoted, which is advantageous. If the magnetic film of the medium is made to be multi-layered by providing a non-magnetic intermediate layer having at least one of Cr, Mo, W, V, Ta, Nb, Zr, Ti, B, Be, C, and Ni—P as the principal constituent, the thickness of one layer is reduced, and the total amount of media noise from all the layers becomes considerably less than the noise from the magnetic film of a single layer. In particular, when an MR head is used, the S/N ratio of the apparatus is considerably improved, which is advantageous. In the medium of the present invention, since the fluctuation of magnetization in the magnetized transition region is extremely small, media noise is small. Therefore, a large-capacity magnetic recording apparatus can be obtained whose S/N ratio is 4 or more at high recording densities of 50 k BPI or more when recording and reading is performed by a magnetic head for high-density recording whose track width is 5 $\mu$m or less and whose overwrite (O/W) characteristics are 26 db or more. In addition, since, in particular, the recesses and projections on the surface of the magnetic film are smaller than in the conventional art, the quality of a servo signal is high even when recording is performed at high densities of 3 k TPI or more, and satisfactory head positioning can be performed, which is advantageous.

The inventors of the present invention examined various methods by which sufficient strength in a multi-layered magnetic recording medium is ensured and in which a decrease in the coercivity arising from the magnetic film being multi-layered is prevented. They found that if C, B, Si, Ge, an Ni—P alloy; or a layer having C, B, Si, Ge, or an Ni—P alloy as principal constituents; or a layer of nitride or oxide of these elements was used for an intermediate layer inserted between magnetic layers, sufficient strength in the multilayered magnetic recording medium could be ensured, and coercivity could be prevented from decreasing. A curve 1001 in FIG. 10 indicates the relationship between the thickness of the intermediate layer and the coercivity when C was used for the intermediate layer. In this medium, two CoPt alloy magnetic layers, each 20 nm thick, were laminated on an Al—Mg alloy substrate (whose surface is plated with Ni—P) with a C intermediate layer sandwiched in between the layers, and a C layer of 70 nm thick was laminated thereon as a protective film. The part at which the thickness of the intermediate layer was zero corresponds to a CoPt-alloy single-layer film of 40 nm thick. The Pt concentration in the CoPt alloy was 20 at %. A curve 1002 in FIG. 1 indicates a comparison of results when Cr, which is being widely studied at present, was used for the intermediate layer. As can be seen in this figure, when Cr was used for the intermediate layer, the coercivity was sharply decreased due to the inserted intermediate layer, whereas when C was used for the intermediate layer, any decrease in the coercivity was not observed. When noises generated from these media in the DC erased state were compared, noise from the medium in which two magnetic films were laminated was lower by approximately 30% than the single-layer magnetic film medium, and no difference between Cr used for the intermediate layer and C used therefor was observed, Then, the strength of these media was evaluated by a pin disk test using a sapphire pin having a curvature of 30 mm. The pressing-down load of the pin was set at 10 gf, and the magnetic disk was rotated so that the speed relative to the medium became 10 m/s. When the number of times of sliding passes needed before the magnetic film was peeled off in the case where the C intermediate layer was used was compared with that needed in the case where the Cr intermediate layer was used, it was found that a service life obtained in the medium using the C intermediate layer was 20 to 30% longer than that of the Cr intermediate layer. Thus, by using C for the intermediate layer, a low-noise multi-layered magnetic recording media having higher coercivity and higher sliding strength than in the conventional art can be obtained. When Co-based alloy magnetic films having CoNi, CoNi, CoFe, CoCr, CoIr, CoW, CoRe, CoNiZr, CoCrPt, CoCrTa or CoNiCr as the principal constituent thereof was used for the magnetic film instead of CoPt, the same effect as above could be obtained.

Regarding prevention of a decrease in the coercivity, an effect similar to the above could be obtained when B, Si, Ge or an Ni—P intermediate layer was used instead of the C intermediate layer. When a compound is used in which at least one type of element selected from a second group consisting of Zr, Nb, Ti, Hf, Ta, Cr, Mo, and W is added to at least one type of element selected from a first group consisting of C, B, Si, Ge, and an Ni—P alloy, or when oxide such as $Ta_2O_5$ or $ZrO_2$ is used, or when nitride such as (Zr—Nb)N and $Si_3N_4$, is used for the intermediate layer, the same effect as above could be obtained. In this case, the amount of the element selected from the second group added to C, B, Si, Ge, or an Ni—P alloy, should be 50 at % or less, and preferably 20 at % or less.

Si and Ge used in place of C are elements having a diamond-like crystal lattice structure which is the same as the structure of C. B and an Ni—P alloy have an amorphous structure. Each intermediate layer effective in preventing coercivity from decreasing, such as one using the above-described elements, compound, oxide or nitride, has a structure completely different from a hexagonal close-packed (hcp) structure of a Co-based alloy magnetic layer, and there is no epitaxial relationship between the magnetic layers formed above and below these intermediate layers. It is known that, in contrast, a Co-based alloy magnetic layer epitaxially grows on the Cr layer having a body-centered cubic (bcc). Based on the above, it is considered that the mechanism for preventing coercivity from decreasing is related to the preventing of a crystalline connection between magnetic layers. In relation to this, it was possible to reduce media noise measured at high recording densities above 50 KFCI by 10 to 20% more than the case in which Cr or a Cr alloy was used for the intermediate layer, as in the conventional art, even if in both cases the same multilayer was used.

Regarding the sliding strength of the medium, a strength the same as or higher than that when the Cr intermediate layer was used could be obtained when any of the intermediate layers effective in preventing coercivity from decreasing was used. When C, B, Si, Ge, an Ni—P alloy, or an intermediate layer having C, B, Si, Ge, an Ni—P alloy as principal constituents from among the above intermediate layers was used, a particularly conspicuous improvement in tribological performance was obtained. Since the intermediate layers, in particular, that formed from C, B, Si, Ge, or Ni—P, shows a high degree of hardness and closely contact among the above-described intermediate layers, it is considered that the hardness and close contact of these intermediate layers is related to the mechanism in which tribological performance increases.

Further, the inventors of the present invention found that it is possible to provide a highly reliable magnetic recording medium suitable for high-density recording having both satisfactory magnetic characteristics and sliding resistant characteristics, to provide a method of manufacturing the same, and to provide a highly reliable, large-capacity magnetic recording apparatus by making the wavelength spectrum of the surface roughness of the magnetic recording media have a plurality of maximum points with respect to the wavelength region of 1 nm to 200 μm, which is achieved by polishing the surface of a non-magnetic substrate using composite abrasive grains formed of a plurality of kinds of abrasive materials, or by etching the surface of a magnetic recording medium.

It is preferable that at least one region where the maximum value of the wavelength spectrum of the surface roughness is present includes a range of wavelengths of 1 to 50 nm, a range of wavelength of 50 nm to 5 μm, or a range of wavelength of 5 μm to 200 μm. This can be achieved in one process which includes polishing the surface of a non-magnetic substrate using composite abrasive grains formed of a plurality of kinds of composite abrasive materials, or by forming projections by etching the surface of the magnetic recording medium after forming a magnetic layer or after forming a magnetic layer and a protective coating layer, after polishing by at least one abrasive material.

Scars formed on the surface of the magnetic recording medium may be substantially parallel to the circumference of the magnetic recording medium, may be oblique to the circumference by 2 to 45 degrees, may be isolated projected scars, or may be two or more of the above.

It is preferable that the composite abrasive grains contain a plurality of kinds of abrasive materials of different compositions, and more preferable, that the composite abrasive grains contain at the same time both an abrasive material having a Mohs hardness of 8 or more and an abrasive material having a Mohs hardness of 7 or less. Examples of abrasive materials having a Mohs hardness of 8 or more are: diamond, $Al_2O_3$ and SiC. Examples of abrasive materials having a Mohs hardness of 7 or less are: $Cr_2O_3$, $SiO_2$, $Fe_2O_3$, $CrO_2$, $SiO_2$, $Fe_2O_3$, $CeO_2$ and MgO. However, abrasive materials of other compositions may be used. The composite abrasive grains may contain a plurality of kinds of abrasive materials of different average grain size. If abrasive materials having an average grain size of 0.5 to 5 μm and of 0.01 to 0.5 μm are contains at the same time, this is even more advantageous. The content of one abrasive material contained in the composite abrasive grains is preferably from 1 wt. % to 99 wt. % in terms of the total amount of 100 wt. %.

A method of forming isolated projections on the surface of the magnetic recording medium may be performed by plasma etching with argon, oxygen, nitrogen or the like by using a patterned mask, a particle mask or the like. Or, materials and film forming conditions may be selected so that an overcoat layer is grown partially abnormally when a protective overcoat layer is formed, and then performing the above method.

The effects given by a great number of polished scars formed on the surface of the non-magnetic substrate are that magnetic anisotropy is provided by aligning the crystal orientation of the magnetic layer, and the magnetic characteristics on the entire recording surface are made uniform. Therefore, for this purpose, relatively small polished scars of a size nearly the same as the crystal grains of the magnetic layer, i.e., of a wavelength of several nm to several tens of nm are effective. If the polished scars are too large, the effect for an improvement in the magnetic characteristics is small.

The effect for an improvement in the sliding resistant characteristics provided by a great number of polished scars formed on the surface of the non-magnetic substrate are that the actual contact area when the magnetic head is brought into contact with the magnetic recording medium is decreased to prevent them from adhering to each other, and a friction coefficient during CSS is kept small. Therefore, for this purpose, the more coarse the surface of the magnetic recording medium, the better. That is, polished scars or projections having a relatively large wavelength of several tens of nm or more are effective. If the polished scars are too small, the effect for an improvement in the sliding resistant characteristics is small.

However, when the surface of the non-magnetic substrate is polished by using only one kind of abrasive material as the abrasive grain, it becomes clear that it is difficult to reconcile the magnetic characteristics and the sliding resistant characteristics, that is, though magnetic characteristics may be superior, sliding resistant characteristics will be inferior, or vice versa. This is due to the fact that, since only polished scars of one type can be formed, in some cases the polished scars are too small, or in some cases the polished scars are too large. A Fourier spectrum analysis of the roughness of this medium shows that there is only one maximum value in the region of the wavelengths of 1 nm to 200 μm. When the surface of the non-magnetic substrate is polished in two steps by using abrasive grains of different sizes, it is possible to reconcile the magnetic characteristics and the sliding resistant characteristics. However, problems arise, for example, many stage are required, and productivity becomes worse.

In regard to this, research by the inventors of the present invention shows that it becomes possible to satisfy direction the magnetic characteristics and the sliding resistant characteristics by making the wavelength spectrum of the surface roughness of the magnetic recording medium have maximums in a plurality of wavelength regions. That is, it is important to make relatively small polished scars suited to improve the magnetic characteristics have a wavelength of 1 nm to 50 nm. Since a wavelength of 1 nm or less is significantly smaller than the crystal grains of the magnetic layer, this is not preferable. Since a wavelength of 50 nm or more is significantly larger than the crystal grains of the magnetic layer, this is not preferable.

It is important for relatively large polished scars suited to improve the sliding resistant characteristics to have a wavelength of 50 nm to 5 μm. When the wavelength is 50 nm or less, since the polished scars are too small, and the area of the contact between the magnetic head and the magnetic recording medium becomes large, the friction coefficient becomes great, and this is not preferable. When the wavelength is 5 μm or more, the polished scars are too large, deteriorating the flying characteristics of the magnetic head, which is not preferable. In another case in which relatively large, isolated projections suited to improve the sliding resistant characteristics are provided, it is important that the wavelength is 5 μm to 200 μm. This is because formation itself is difficult since the projections are too small when the wavelength is 5 μm or less; when the wavelength is 200 μm or more, the projections are too large to be ignored compared with the size of the magnetic head, thereby deteriorating the flying characteristics of the magnetic head, which also is not preferable.

The above results are achieved simultaneously in one step by polishing the surface of the non-magnetic substrate using composite abrasive grains formed of a plurality of kinds of abrasive materials, or by forming projections on the surface of the magnetic recording medium by an etching process or the like. Scars formed on the surface of the magnetic recording medium may be substantially parallel to the circumference of the magnetic recording medium, oblique to the circumference by 2 to 45 edges, or isolated projected ones, because both the magnetic characteristics and the sliding resistant characteristics are satisfied. Further, when these two or more are present, it becomes easy to control the magnetic characteristics and the sliding resistant characteristics, which is preferable. In the case of scars oblique to the circumference, when the angle is 2 degrees or less, the effect regarding obliqueness cannot be obtained, which is not preferable. When the angle is 45 degrees or more, the effect for aligning the crystal orientation of the magnetic layer to the circumference direction is decreased, which is not preferable.

If a plurality of kinds of abrasive materials of different compositions are used, the polishing characteristics of respective abrasive materials can be utilized individually, which is preferable. More specifically, large polished scars can be formed by abrasive materials having a Mohs hardness of 8 or more, for example, diamond, $Al_2O_3$, and SiC, because they have a high degree of hardness. Small polished scars can be formed by abrasive materials having a Mohs hardness of 7 or less, for example, $Cr_2O_3$, $SiO_2$, $Fe_2O_3$, $CeO_2$ or MgO, because they have a relatively low degree of hardness. Therefore, if two abrasive materials of different compositions are used simultaneously, this is even more advantageous. Abrasive materials of other compositions may be used.

Composite abrasive grains may be formed of a plurality of kinds of abrasive materials of different average grain sizes. When abrasive materials having an average grain size of 0.5 $\mu$m to 5 $\mu$m and abrasive materials having an average grain size of 0.01 $\mu$m to 0.5 $\mu$m are used simultaneously, it is possible to form relatively small polished scars suited to improve magnetic characteristics and relatively large polished scars suited to improve sliding resistant characteristics in one step at the same time, which is advantageous. Abrasive materials having an average grain size of 0.01 $\mu$m to 0.5 $\mu$m are preferable to form relatively small polished scars suited to improve magnetic characteristics. This is because a polishing effect cannot be obtained effectively when the average grain size is 0.01 $\mu$m or less, which is not advantageous, and, when the average grain size is 0.5 $\mu$m or more, polished scars become too large, which also is not preferable.

Abrasive materials having an average grain size of 0.5 $\mu$m to 5 $\mu$m are preferable to form relatively large polished scars suited to improve sliding resistant characteristics. This is because when the average grain size is 0.5 $\mu$m or less, the polished scars become too small, which is not preferable. When such size is 5 $\mu$m or more, the polished scars become too large, deteriorating the flying characteristics of the magnetic head, which is not preferable. Effects can be obtained respectively whether the compositions of a plurality of kinds of abrasive materials having different average grain size are the same or different.

The content of one abrasive material contained in the composite abrasive grains is preferably from 1 wt. % to 99 wt. % in terms of the total amount of 100 wt. %. When the content is 1 wt. % or less, a polishing effect cannot be obtained effectively, which is not preferable. When the content exceeds 99 wt. %, the content of other abrasive materials contained becomes 1 wt. % or less, thereby minimizing the effect of compounding two or more types of abrasive materials, which is not preferable. The same effect as above can be obtained whether polishing is performed in a condition in which the abrasive materials are fixed to a polishing cloth or the polishing cloth is separated from the abrasive materials.

A highly reliable, large-capacity magnetic recording apparatus can be preferably manufactured by substantially combining the magnetic recording medium of the present invention with a magnetic head in which an metallic magnetic alloy or an magnetoresistive sensor is contained in a part of a magnetic core, and zirconia, or alumina titanium carbide ($Al_2I_3.TiC$), or ferrite is used as the principal constituent of the magnetic core. This is due to the fact that since zirconia, or alumina titanium carbide, or ferrite has heat conductivity of 0.005 cal/sec/cm/deg or more, and since the amount of thermal strain and thermal volatilization of lubricants is small, the sliding resistant characteristics are improved. In particular, by combining the magnetic recording medium having multi-layered magnetic film with the magnetic head having a magnetoresistive sensor in a part of a magnetic core, media noise can be reduced, and the signal output can be increased. As a result, a highly reliable magnetic recording apparatus having a storage capacity twice that of the conventional art can be manufactured.

The above and further objects and novel features of the invention will be more apparent from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 5:
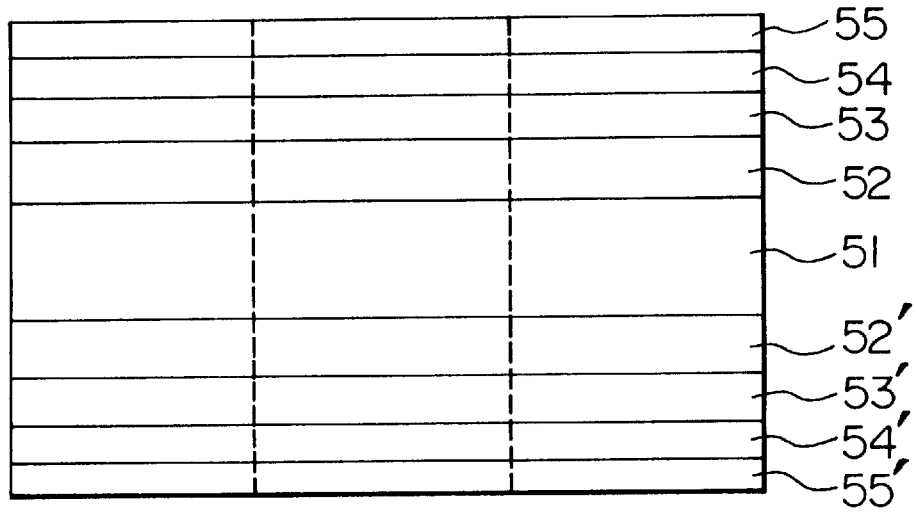
FIG. 5 is a longitudinal, view of the medium in accordance with the embodiment of the present invention.

Preferred embodiments will be explained below with reference to the accompanying drawings. FIG. 5 is a schematic longitudinal, sectional view of the thin-film medium in accordance with an embodiment of the present invention. In FIG. 5, reference numeral 51 denotes a substrate formed from an A—Mg alloy, chemical strengthened glass, organic resin, Ti, Si, carbon, ceramics or the like; reference numerals 52 and 52' denote non-magnetic plated layers formed from Ni—P, Ni—W—P or the like formed on both sides of the substrate 51, generally such layers provided with a plated layer are used as a substrate when an Al—Mg alloy is used as the substrate; reference numerals 53 and 53' denote metallic underlayers formed from Cr, Mo, W, or an alloy having any one of these elements as the principal constituents; reference numerals 54 and 54' denote metallic magnetic layers formed on the underlayers, which are formed from Co—Ni, Co—Cr, Co—Re, Co—Pt, Co—P, Co—Fe, Co—Ni—Zr, Co—Cr—Pt—B, Co—Cr—Al, Co—Cr—Ta, Co—Cr—Pt, Co, Ni—Cr, Co—Cr—Nb, Co—Ni—P, Co—Ni—Pt, Co—Cr—Si or the like; and reference numerals 55 and 55' denote non-magnetic protective films formed on the magnetic layers, which films are formed from carbon, boron, $B_4C$, SiC, $SiO_2$, $Si_3N_4$, WC, (W—Mo)C, (W—Zr)C or the like.

[First Embodiment]

A plated layer formed from Ni—12P was formed on both sides of a disk substrate formed from A—4Mg (the numeral given before the atomic symbol indicates the content of the material: the unit of the content is wt. %) having an outer diameter of 95 mm, an inner diameter of 25 mm and a thickness of 0.8 mm so that the thickness of the plated layer becomes 13 $\mu$m. The surface of the non-magnetic substrate was polished by using a lapping machine until the surface average roughness factor Ra becomes 2 nm so that the surface became flat, cleaned and dried. Thereafter, polishing tape was pressed by using a tape polishing machine (e.g., that disclosed in Japanese Patent Laid-Open No. 62-262227) via a contact roll in the presence of abrasive grains while the disk substrate 51 was being rotated, so that texture was formed circumferentially (substantially parallel to the recording direction) on the surface of the disk substrate. Under this circumstance, Ra(r) on the surface of the medium is varied by controlling the average grain size of the abrasive grains, processing period of time and the pressure by which the polishing tape was pressed by the contact roll. Further, contaminants such as abrasive materials adhered to the substrate was cleaned, removed, and dried. The disk substrate formed in this way was heated to 250° C. in a vacuum inside a magnetron sputtering apparatus, and a Cr underlayer, 50 nm thick, was deposited under the condition of argon pressure of 2 mTorr. A metallic magnetic film of 30 nm thick formed from 86Co—10Cr—4Ta (at. %) was deposited on the underlayer. Thereafter, a carbon protective film of 30 nm thick was deposited on the magnetic film. Finally, an adsorptive lubricant layer of perfluoroalkyl-polyether or the like was deposited on the protective film. An analysis of the magnetic recording medium formed in this way by X-ray diffraction showed that the crystal was grown to be oriented in such a way that the (100) or (110) crystal lattice plane became substantially parallel to the substrate in the Cr underlayer. In the magnetic layer, the crystal was grown to be oriented in such a way that the (110) crystal lattice plane became substantially parallel to the substrate.

The average roughness factor Ra(θ) on the surface of the medium formed in this way, measured in the recording direction and the average roughness factor Ra(r) measured perpendicularly to the recording direction were determined by using a needle-touch type surface profiler having a needle-tip diameter of 0.2 $\mu$m. At this time, the pressing-down load of the touch-type needle was set at 4 mg, the speed of the touch-type needle was set at 1 $\mu$m/s, and cutoff was set at 4.5 $\mu$m. Under the conditions of the speed of the head relative to the medium of 12 m/s, and the flying spacing of 0.08 $\mu$m, the number of bit errors after a test of 50,000 head seeks from the inner circumference to the outer circumference, modulation (Md), and S/N of a read output when the linear recording density was 50 k BPI and the track density of 3 k TPI were determined by using an inductive write MR read thin-film magnetic head using an MR sensor, whose effective gap length was 0.4 $\mu$m and whose track width was 5 $\mu$m. Here, modulation Md is defined as Md=(H–L)/(H+L) on the basis of the maximum output H and the minimum output L within the disk surface. Also, coercivity Hc(θ) when a magnetic field was applied in the recording direction and coercivity Hc(r) when a magnetic field was applied substantially perpendicularly to the recording direction within the substrate surface were determined by a vibrating sample magnetometer (VSM) having a maximum applied magnetic-field of 14 kOe or a non-destructive magnetometer of 14 kOe. Also, in-plane magnetic anisotropic energy K was determined by a torque magnetometer having a maximum applied magnetic-field of 14 kOe by applying a magnetic field within the substrate surface and by rotating the sample within the substrate surface.

Figure 3:
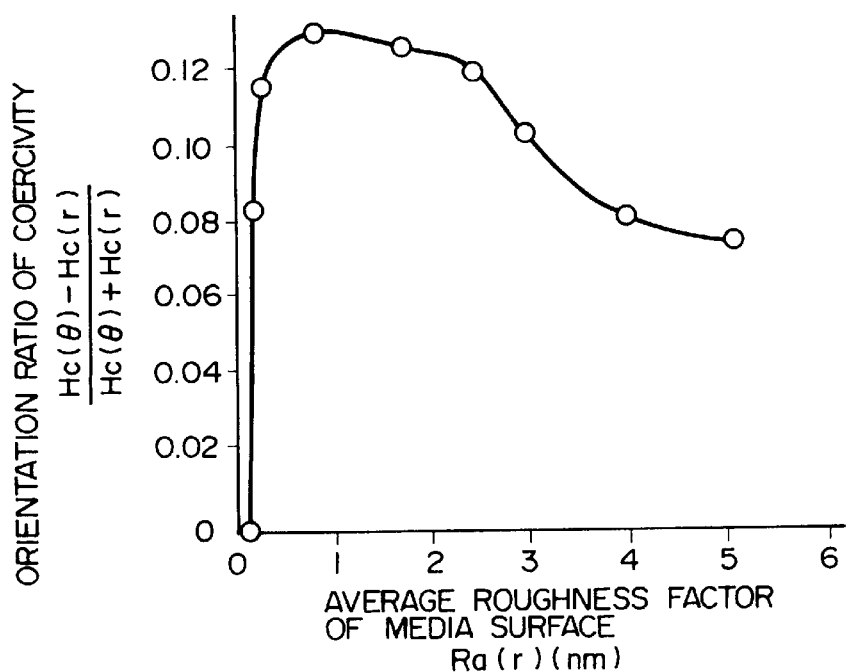
FIG. 3 illustrates the relationship between the average roughness factor of media surface and the orientation of coercivity in accordance with the embodiment of the present invention.
Figure 6:
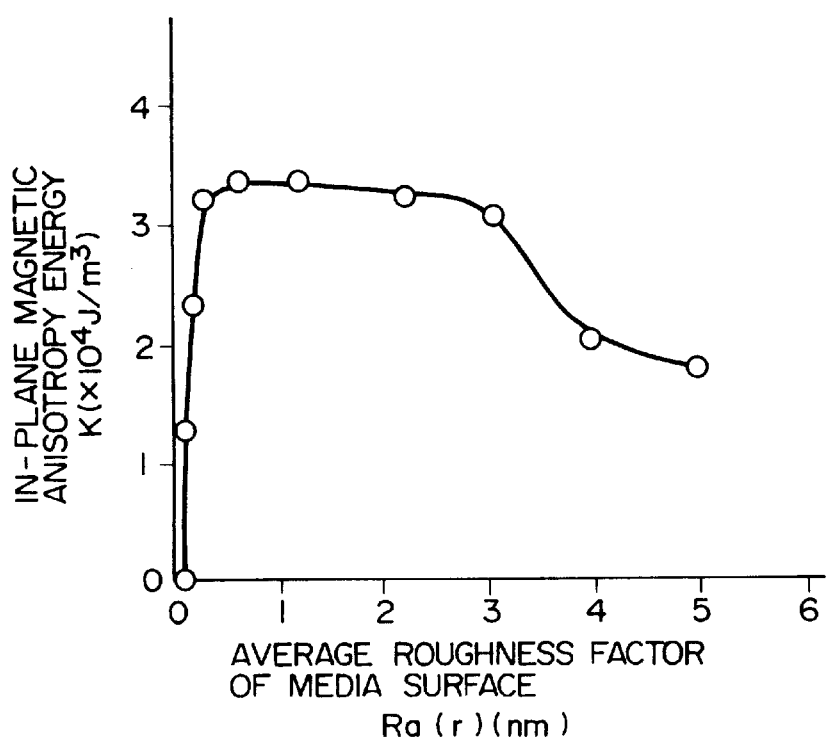
FIG. 6 illustrates the relationship between the average roughness factor of media surface, and the in-plane magnetic anisotropic energy in accordance with the embodiment of the present invention.

As compared with the conventional art in which the average roughness factor Ra(r) of the medium surface exceeds 3 nm as shown in FIG. 3, in the medium in which texture was formed by using abrasive grains having an average grain size of 1 $\mu$m or less and the surface roughness of 0.3 nm≦Ra(r)≦3 nm, the above-described coercivity orientation ratio become remarkably as high as from 0.1 to 0.7. Also, as compared with the conventional art in which the average roughness factor Ra(r) exceeds 3 nm, as shown in FIG. 6, in the medium in which texture was formed by using abrasive grains having average grain size of 1 μm or less and the surface roughness of 0.3 nm≦Ra(r)≦3 nm, the in-plane magnetic anisotropic energy K becomes as high as from $3×10^4$ J/m$^3$ to $5×10^4$ J/m$^3$. On the medium surface, an average number of the thus formed fine grooves of not less than 1 nm depth existing per 1 μm in a direction substantially across the recording truck was not less than 0.5 but not more than 100, the range of Rmax(r)/Ra(r) being 10 to 30, and Ra(r)/Ra(θ) was 1.1 to 3.0. The number of bit errors was 10 bits or less per plane after a test of 50,000 head seeks from the inner circumference to the outer circumference when the flying height of the head was 0.08 μm or less, the modulation of the medium was 10% or less, and the value of the S/N ratio was 4 or more when the linear recording density was 50 k BPI and the track density was 3 k TPI. In the conventional magnetic recording medium having Ra(r) of 3 nm or more, the flying height of the head was inferior; the number of bit errors was 15 bits or more per plane after a test of 50,000 head seeks when the flying height of the head was 0.08 μm.

Surface roughness, magnetic anisotropy and read/write characteristics all similar to the above were obtained when there were used a substrate on which similar very small grooves were formed, and an underlayer formed of Cr, Mo, W, Nb, Ta or an alloy having these elements as the principal constituents, was formed to have a thickness of 5 to 500 nm as an underlayer. When the magnetic layer was formed to have two or more layers by providing a non-magnetic intermediate layer having at least one element from Cr, Mo, W, V, Ta, Nb, Zr, Ti, B, Be, C, and Ni—P as principal constituents, noise from the media was reduced by 30% more than in a case in which a magnetic film of a single layer was used, and the S/N ratio of 5 or more was obtained.

[Second Embodiment]

Figure 7:
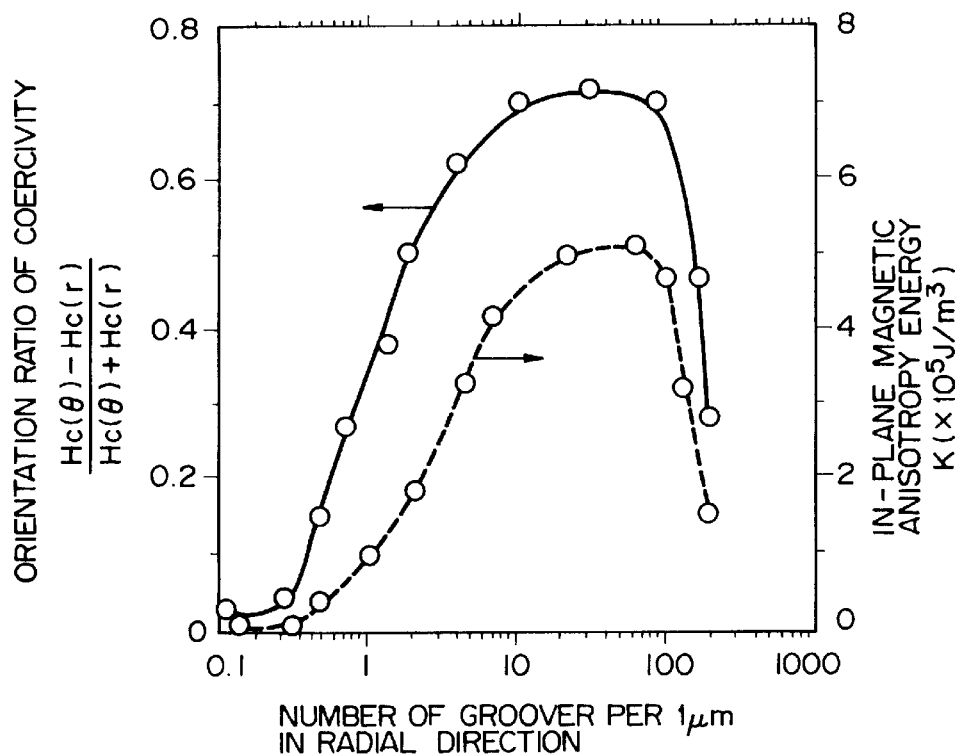
FIG. 7 illustrates the relationship between the density of the average number of grooves on the surface of the medium, the orientation ratio of coercivity, and the in-plane magnetic anisotropic energy.

Using the same lapping apparatus as in the first embodiment under the conditions where the grain size of abrasive grains used to form texture was 0.5 μm, the average number N of grooves of 1 nm deep or more present on the surface of the medium per 1 μm perpendicular to the recording direction, was varied keeping Ra(r) on the surface of the medium from 0.5 μm to 1.0 μm, by controlling processing period of time, processing direction and the pressure by which polishing tape was pressed by a contact roll. The relationship between the average number N of grooves, the coercivity orientation ratio and the in-plane magnetic anisotropic energy K is shown in FIG. 7. When N was from 0.5 to 100, the orientation ratio become 0.15 to 0.7, and the in-plane magnetic anisotropic energy becomes $4×10^4$ J/m$^3$ to $5×10^5$ J/m$^3$. The range of Rmax(r)/Ra(r) of the medium on which such very small grooves were formed was from 10 to 30, and the range of Ra(r)/Ra(θ) was from 1.1 to 3.0. The number of bit errors was 10 bits or less per plane after a test of 50,000 head seeks from the inner circumference to the outer circumference when the flying height of the head was 0.08 μm, the modulation of the medium was 10% or less, the value of the S/N ratio was 4 or more when the linear recording density was 50 k BPI and the track density was 3 k TPI.

[Third Embodiment]

Figure 1:
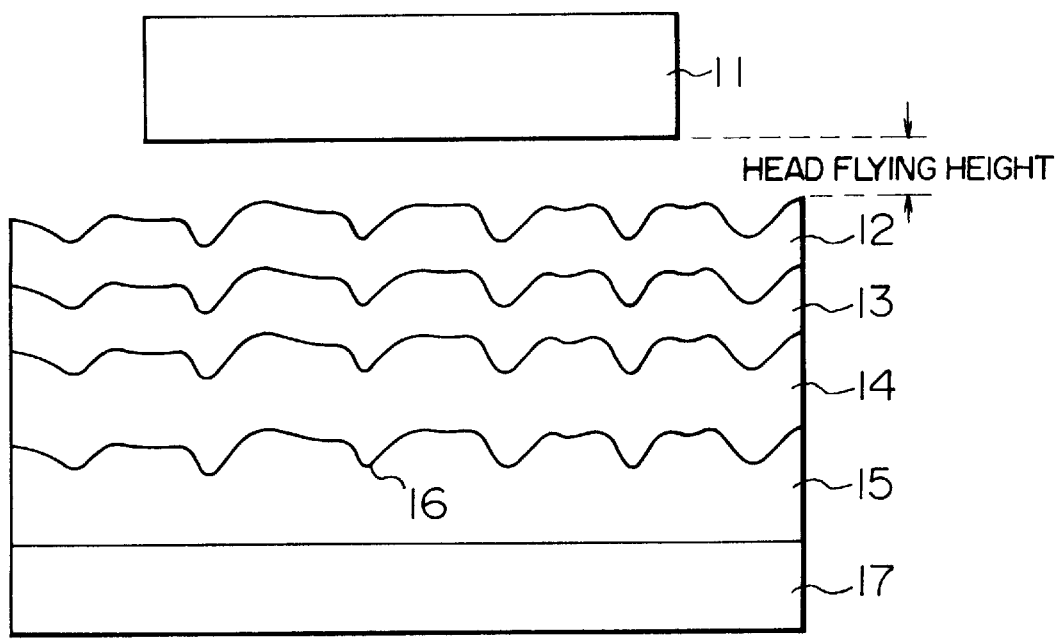
FIG. 1 is a longitudinal, sectional view of a thin-film magnetic recording medium, illustrating the relationship between the medium and the MR head in accordance with an embodiment of the present invention.
Figure 2:
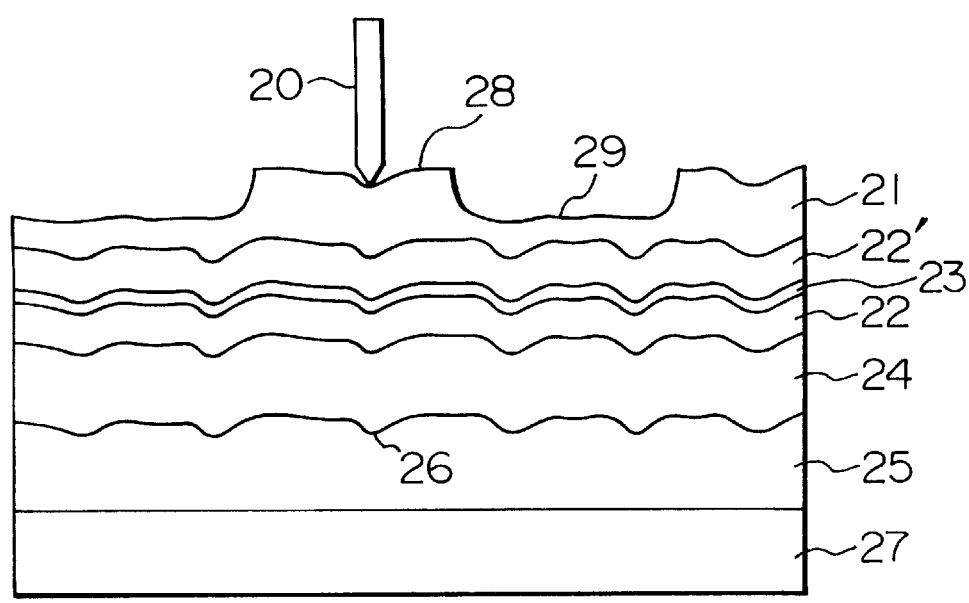
FIG. 2 is a longitudinal, sectional view of the thin-film magnetic recording medium in accordance with the embodiment of the present invention.

As shown in FIG. 2, a Cr underlayer 25 was formed to have a thickness of 1 μm on both sides of a glass disk substrate 27 having an outer diameter of 65 mm, an inner diameter of 20 mm, a thickness of 0.4 mm, and surface coarseness of 1 nm by using the same sputtering apparatus and under the same conditions as in the first embodiment. Then, the surface of the Cr underlayer 25 was polished by polishing tape containing abrasive materials whose average grain size of 1 μm or less in a vacuum chamber, and texture was formed circumferentially. Ra of the surface of the Cr underlayer was 0.8 nm, and the average number N of grooves was 0.7. Grooves were denoted by numeral 26. An underlayer 24 of 90Cr—10Ti (at. %) of 50 nm thick was formed thereon. Further, a 84Co—12Cr—4Pt (at. %) magnetic film 22 of 15 nm thick, a Cr intermediate film 23 of 2.5 nm thick, and 84Co—12Cr—4Ta (at. %) magnetic film 22 of 15 nm thick, were formed thereon. Thereafter, a carbon protective film 21 of 30 nm thick was formed. Then, an etching mask whose average distance of its windows was from 50 to 100 μm was provided on the surface of the carbon protective film, and the carbon protective film of that region which is not covered by the mask was etched to a depth of 15 nm by oxygen plasma etching. As a result, as shown in FIG. 2, island-like recesses 29 and projections 28 having an average size of 50 to 100 μm were formed on the surface of the carbon protective film. Finally, an adsorptive lubricant layer of perfluoroalkyl-polyether or the like was formed on the carbon protective film. The average roughness factor Ra(r) on the island-like portions 28 of the protective film of this medium was 1.0 nm; the in-plane magnetic anisotropic energy K was $3×10^4$ J/m$^3$; the average number N of grooves having a depth of 1 nm or more per 1 μm substantially perpendicularly to the movement was 0.7; the value of Rmax(r)/Ra(r) was 12; and the value of Ra(r)/Ra(θ) was 1.6. The number of bit errors after a test of 50,000 head seeks from the inner circumference to the outer circumference when the flying height of the head was 0.1 μm was 10 bits or less per plane, the modulation Md of the medium is 10% or less, the value of the S/N ratio was 4.5 when the linear recording density was 90 k BPI and the track density was 4 k TPI. In the load/unload method in which the head does not contact the medium when the medium is stopped, this medium showed sliding resistant reliability similar to that of the medium described in the first embodiment. However, when the head is made to fly in the CSS method, the adhesion of the head can be reduced more than that of the medium in the first embodiment, improving the reliability.

[Fourth Embodiment]

Figure 8:
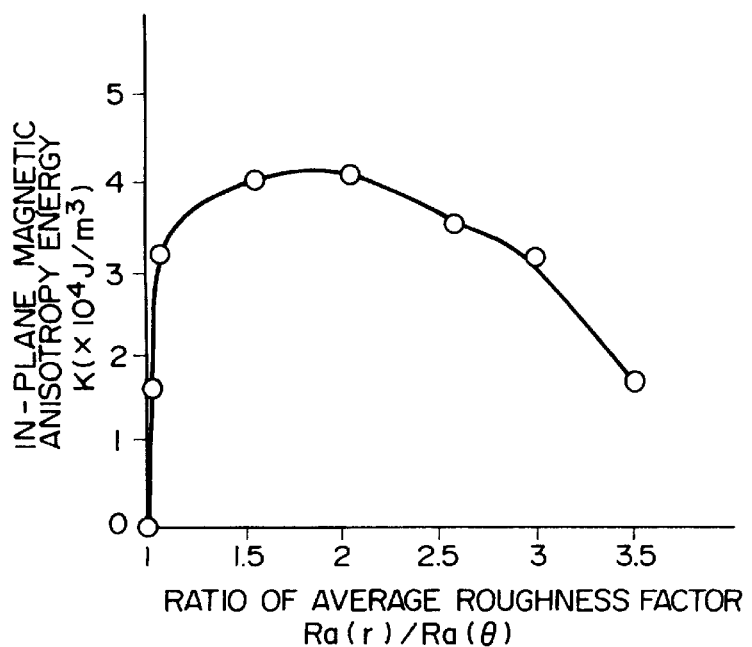
FIG. 8 illustrates the relationship between the ratio of the average roughness factor of media surface $Ra(r)/Ra(\theta)$ and the in-plane magnetic anisotropic energy in accordance with the embodiment of the present invention.

Very fine texture was formed on the disk substrate by using abrasive grains having an average size of 1 μm or less in the same manner as in the first embodiment. At this time, the ratio of the average roughness factor, Ra(r)/Ra(θ), was varied by controlling the processing period of time when texture was formed on the disk substrate and the pressure by which polishing tape was pressed by a contact roll. Then, a magnetic film and a protective film were formed on the substrate. Thereafter, island-like recesses and projections having an average sizes of 5 to 10 μm and a height of 10 nm were formed on the protective film by the same method as in the third embodiment. After the magnetic anisotropy of the medium, head flying properties, and recording and reproduction characteristics were measured, the protective film was removed by oxygen plasma etching, and Ra(r)/Ra(θ) on the surface of the magnetic film was measured. At this time, Ra(r) was from 0.5 to 3 nm. The relationship between Ra(r)/Ra(θ) and the in-plane magnetic anisotropic energy K is shown in FIG. 8. The in-plane magnetic anisotropic energy K became as high as from $3×10^4$ J/m$^3$ to $5×10^5$ J/m$^3$ when Ra(r)/Ra(θ) was from 1.1 to 3.0. The average number of grooves of 1 nm deep of more present on the surface of the medium per 1 μm perpendicular to the recording direction, was from 5 to 100; the range of the value of Rmax(r)/Ra(r) was from 10 to 30. The number of bit errors after a test of 50,000 head seeks from the inner circumference to the outer circumference when the flying height of the head was 0.06 μm was 10 bits or less per plane; the modulation of the medium was 10% or less, the value of the S/N ratio was 4 or more when the linear recording density was 50 k BPI and the track density was 3 k TPI.

[Fifth embodiment]

Shown in Table 1 are the number of bit errors, modulation and the value of S/N when Ra(r) and Rmax(r)/Ra(r) were varied by varying the average grain size of the abrasive grains used to form texture on the disk substrate, processing time and the pressure by which polishing tape was pressed by a contact roll in the same manner as in the first embodiment.

the media of the comparative examples were used, and a small in size, large-capacity magnetic recording apparatus was able to be provided. In this apparatus, when MR heads having a track width of 5 μm or less, there was obtained a large-capacity magnetic recording apparatus whose S/N ratio was 4 or more in such high recording density as 90 k BPI and 4 k TPI and whose overwrite (O/W) characteristics were 26 dB or more.

Although in this embodiment a case in which a thin-film magnetic head using a Co—Ta—Zr alloy as a pole material was used for recording is described, it was confirmed that an effect similar to the above was able to be obtained even

TABLE 1

| Specimen No | Ra(nm) | Rmax(r)/Ra(r) | Number of bit errors (Bits/plane) | Modulation Md (%) | In-plane magnetic anisotropic energy K($10^4$ J/m$^3$) | S/N |
|---|---|---|---|---|---|---|
| Comparative Example | 5.0 | 8.4 | 35 | 7 | 3.2 | 3.4 |
| 1 | 0.2 | 12 | 1 | 25 | 1.1 | 2.2 |
| 2 | 0.3 | 8.5 | 1 | 18 | 2.2 | 2.5 |
| 3 | 0.3 | 11 | 1 | 7 | 3.1 | 4.2 |
| 4 | 0.5 | 30 | 3 | 5 | 5.5 | 4.5 |
| 5 | 0.6 | 51 | 15 | 11 | 2.6 | 2.2 |
| 6 | 1.0 | 8.8 | 2 | 13 | 2.5 | 2.7 |
| 7 | 1.1 | 10 | 2 | 5 | 4.2 | 4.4 |
| 8 | 1.3 | 29 | 4 | 4 | 6.7 | 4.6 |
| 9 | 1.4 | 53 | 18 | 12 | 2.8 | 3.5 |
| 10 | 2.1 | 23 | 4 | 3 | 6.5 | 4.7 |
| 10 | 3.0 | 21 | 4 | 3 | 6.5 | 4.8 |
| 11 | 3.0 | 31 | 19 | 2 | 2.8 | 3.7 |
| 12 | 4.0 | 13 | 21 | 2 | 2.6 | 3.8 |

As seen in Table 1, when Ra(r) on the surface of the medium is from 0.3 nm to 3 nm, Rmax(r)/Ra(r) is from 10 to 30, the number of bit errors and modulation Md of the medium of this embodiment are smaller than those of the conventional art, the in-plane magnetic anisotropic energy and S/N ratio of this embodiment are greater than those of the conventional art, so that the number of bit errors is 10 bits per plane or less, modulation is 10% or less, and S/N ratio is 4 or more. Under this circumstance, the ratio of Ra(r)/Ra(θ) is from 1.1 to 3.0, and the average number of grooves of 1 nm deep or more present on the surface of the medium per 1 μm perpendicular to the recording direction, is from 0.5 to 100.

[Sixth Embodiment]

Figure 9:
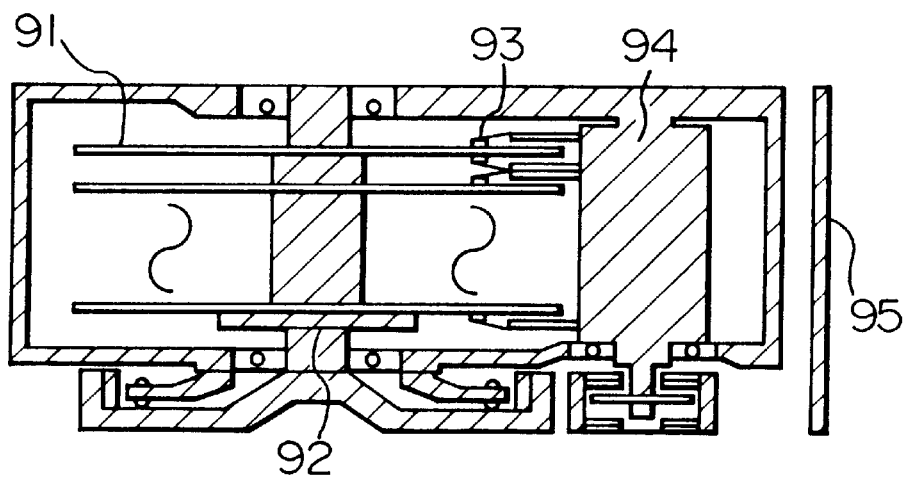
FIG. 9 is a longitudinal, sectional view of the magnetic recording apparatus in accordance with the embodiment of the present invention.
Figure 10:
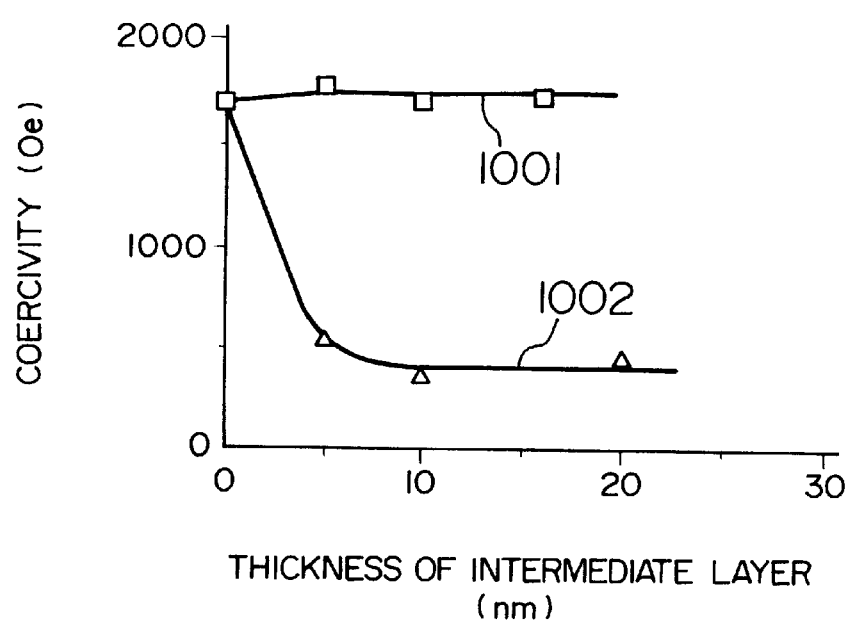
FIG. 10 illustrates the relationship between the thickness of the intermediate layer and the coercivity in a multilayered film magnetic recording medium of the present invention and in a conventional multilayered film magnetic recording medium.

A magnetic recording apparatus was produced using four magnetic recording media shown in third embodiment being used and seven thin-film magnetic heads in which magnetoresistive sensor and inductive write head with the magnetic pole of Co—Ta—Z alloy were combined. As shown in FIG. 9, this apparatus comprises a magnetic recording media 91, a section 92 for driving magnetic recording media, magnetic heads 93, a section 94 for driving the magnetic head, and a read and write signal processing system 95. Mean time between failure (MTBF) of this apparatus with a head flying height of 0.08 μm was examined, it was demonstrated that this ten times longer than that of the magnetic recording apparatus in which the recording means of comparative examples (which will be described later) were used, and the reliability of the apparatus was very high. In the magnetic recording apparatus produced in this embodiment, since the flying height of the head was small, the phase margin when signals were read and written was wide, and since the quality of servo signals was high, head positioning accuracy was improved. Therefore, the surface recording density was increased twice compared to the case in which when a read and write separated type thin-film magnetic head which used Ni—Fe, Co—Fe alloys or the like as recording pole materials, a metal-in-gap (MIG) type read and write separated multi-magnetic head having Co—Ta—Zr, Fe—Al—Si alloy or the like provided in the gap portion, an induction type thin-film magnetic head, or a MIG head was used.

[Seventh Embodiment]

Figure 11:
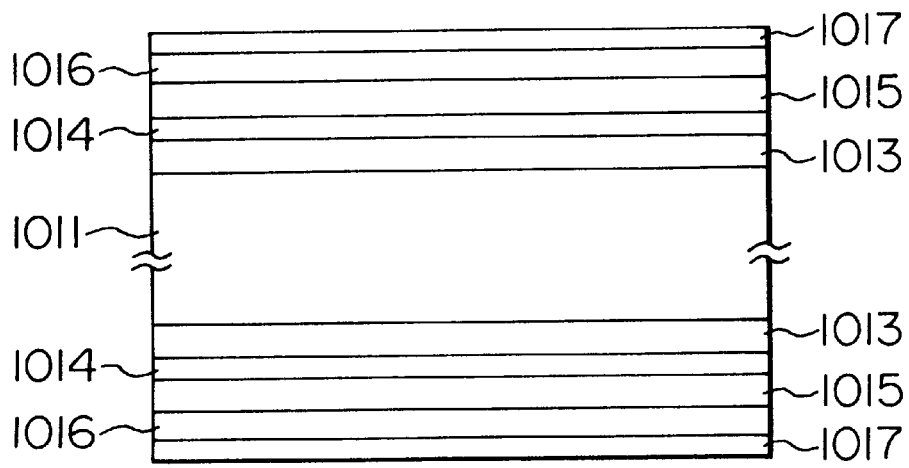
FIG. 11 is a sectional view illustrating the layer structure of an embodiment of a multilayered film magnetic recording medium of the present invention.

FIG. 11 is a sectional view illustrating the layer structure of an embodiment of a multilayered magnetic recording medium in accordance with the present invention. The multilayered magnetic recording medium of this embodiment was provided with: a non-magnetic substrate 1011 formed from Al—Mg alloy whose surface was plated with Ni—P, Ti alloy, strengthened glass, organic resin, ceramics or the like, a first magnetic layer 1013; an intermediate layer 1014; a second magnetic layer 1015, a protective layer 1016, and a lubricant layer 1017, all of which were formed on the non-magnetic substrate 1011 in sequence by a sputtering method. Here, the first magnetic layer 1013 and the second magnetic film 1015 were Co—10 at. % Cr—8 at. % Pt alloy layers of 20 nm thick, and the intermediate layer 1014 was a C layer of 10 nm thick. The thickness of the C protective layer 1016 was set at 40 nm. The lubricant layer 1017 was adsorptive perfluoroalkyl-polyether.

Coercivity measured by a vibrating sample magnetometer was 2,100 oersted (Oe), which value was equal to or greater than the coercivity 2,080 Oe of the magnetic recording medium of a single layer manufactured for comparison by replacing the three layers of the first and second magnetic layers and the intermediate layer with a single layer of Co—10 at % Cr—8 at % Pt alloy layer. Next, read and write characteristics was measured. An evaluation was made by using a magnetic head in which a recording inductive thin-film head whose effective gap length was 350 nm and a reading magnetoresistive head were combined under such conditions that the speed of the magnetic head relative to the medium was 12 m/s and the head flying height was 80 nm. As a result, the media noise was reduced by approximately 30% more than a case in which the single-layer magnetic recording medium for comparison was used. Media noise was smaller by approximately 20% than in a case in which, instead of C, Cr was used as the intermediate layer whose thickness was the same as that of C. A half-output recording density (D50) was 76 k FCI, and a value similar to that of the single-layer magnetic recording medium was obtained. Further, after 30,000 CSSs were performed, read and write error rates were measured, with the result that no increase in error rates after CSSs was observed.

When B, Si, Ge, a Ni—P alloy, $Ta_2O_5.ZrO_2$, (Zr—Nb) N, $Si_3N_4$, or the like was used as the material of the intermediate layer 1014 instead of C, an effect similar to the above was obtained. Also, when a compound was used in which at least one element selected from a second group consisting of Zr, Nb, Ti, Hf, Ta, Cr, Mo, and W was added to at least one element or a compound selected from a first group consisting of C, B, Si, Ge, and an Ni—P alloy, as the intermediate layer 1014, an effect similar to the above was obtained. When CoPt, CoNi, CoFe, CoCr, CoIr, CoW, CoRe, CoNiZr, CoCrTa, or CoNiCr was used as the material of the magnetic film instead of Co—Cr—Pt, an effect similar to the above was obtained. The above-described multilayered magnetic recording medium has two magnetic films stacked with the intermediate layer 1014 sandwiched therebetween. When the thickness of the magnetic layers 1013 and 1015 was set at 14 nm, and when an intermediate layer and a magnetic layer were inserted in this order between the second magnetic film 1015 and the C protective layer 1016 so that the magnetic layer was formed into three layers, it was possible to further reduce media noise by approximately 20%. In this case also, no increase in error rates after 30,00 CSSs was observed.

[Eight Embodiment]

Figure 12:
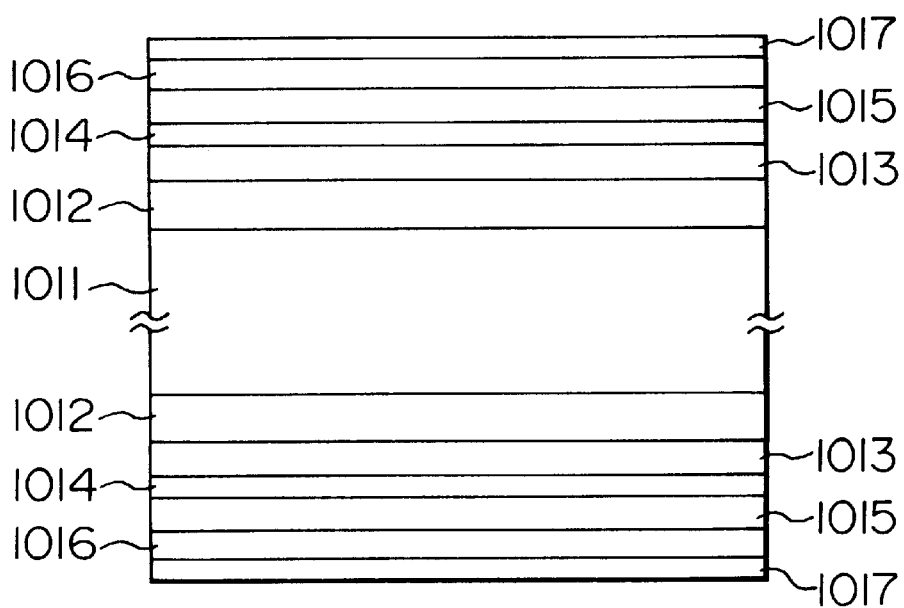
FIG. 12 is a sectional view illustrating the layer structure of another embodiment of a multilayered film magnetic recording medium of the present invention.

FIG. 12 is a sectional view illustrating the layer structure of another embodiment of a multilayered magnetic recording medium in accordance with the present invention. In the same manner as in the seventh embodiment, the multilayered magnetic recording medium of this embodiment was formed on the non-magnetic substrate 1011 formed from Al—Mg alloy whose surface was plated with NiP, Ti alloy, strengthened glass, organic resin, ceramics or the like. A Cr underlayer 1012, the first magnetic layer 1013, the intermediate layer 1014, the second magnetic layer 1015 and the C protective layer 1016 were formed in sequence by sputtering on the non-magnetic substrate 1011, and the lubricant layer 1017 was formed thereon by coating. In the same manner as in the seventh embodiment, the first magnetic layer 1013 and the second magnetic film 1015 were Co—10 at % Cr—8 at % Pt alloy layers of 20 nm thick, and the intermediate layer 1014 was a C layer of 10 nm thick. The thickness of the C protective layer 1016 was set at 40 nm. The lubricant layer 1017 was adsorptive perfluoroalkyl-polyether. The thickness of the Cr underlayer 1012 was set at 50 nm. Coercivity measured by a vibrating sample magnetometer was 2,200 Oe, which value was equal to or greater than the coercivity 2,140 Oe of the magnetic recording medium of a single layer manufactured for comparison by replacing the three layers of the first magnetic layer 1013 and the second magnetic film 1015 and the intermediate layer with a single layer of Co—10 at % Cr—8 at % Pt alloy layer, 40 nm thick. Next, read and write characteristics were measured under the same conditions as those in the seventh embodiment. Media noise was reduced by approximately 30% more than the case in which the single-layer magnetic recording medium for comparison purposes was used. A half-output recording density (D50) was 80 k FCI, and a value equivalent to that of the single-layer magnetic recording medium was obtained. When an error rate was measured after 30,000 CSSs were performed, no increase in the error rate after CSSs was observed.

When B, Si, Ge, or a Ni—P alloy is used as the material of the intermediate layer 1014 instead of C, an effect similar to the above was obtained. Also, when a compound was used in which at least one element selected from a second group consisting of Zr, Nb, Ti, Hf, Ta, Cr, Mo, and W was added to at least one element or a compound selected from the first group consisting of C, B, Si, Ge, and an Ni—P alloy, as the intermediate layer 1014, an effect similar to the above was obtained. Further, when NbO, MgO, ZrN, TiN, HfN or the like was used, an effect similar to the above was obtained. When CoPt, CoNi, CoFe, CoCr, CoMo, CoW, CoRe, CoNiZr, CoCrTa, or CoNiCr was used as the material of the magnetic film instead of Co—Cr—Pt, an effect similar to the above was obtained. When the magnetic layer was formed to have three layers in the same manner as in the seventh embodiment, media noise was reduced by approximately 20% more than the case in which the magnetic layer had two layers. In this case also, no increase in the error rate after 30,000 CSSs was observed.

[Ninth Embodiment]

Figure 13A:
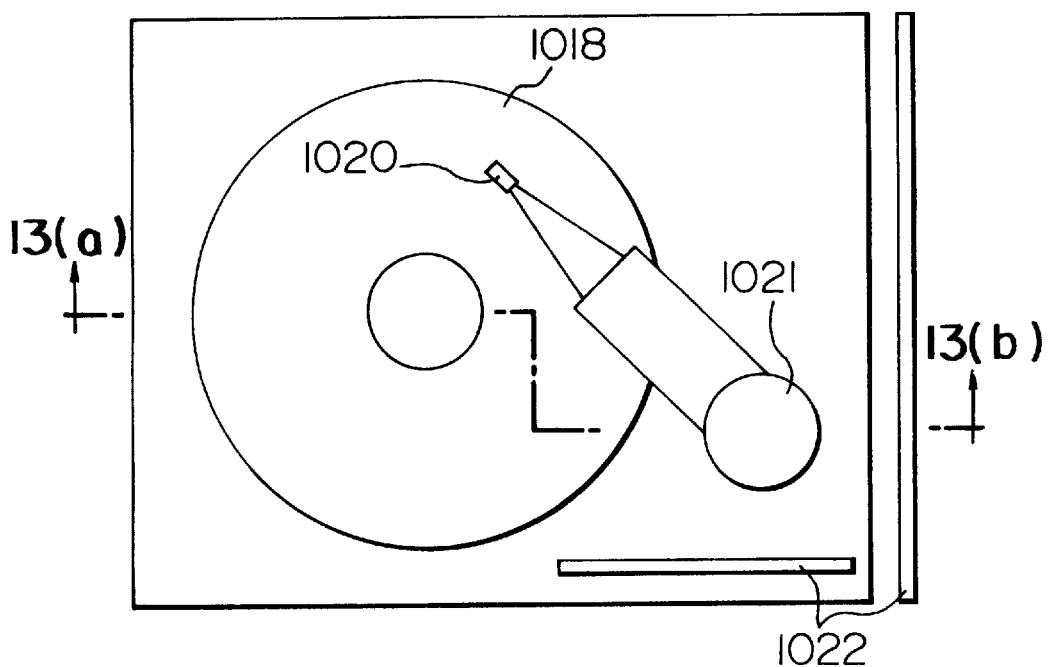
FIGS. 13(a) and 13(b) are a plan view of the embodiment of the magnetic recording apparatus of the present invention, and a sectional view taken along the line A–A' of FIG. 13(a), respectively.
Figure 13B:
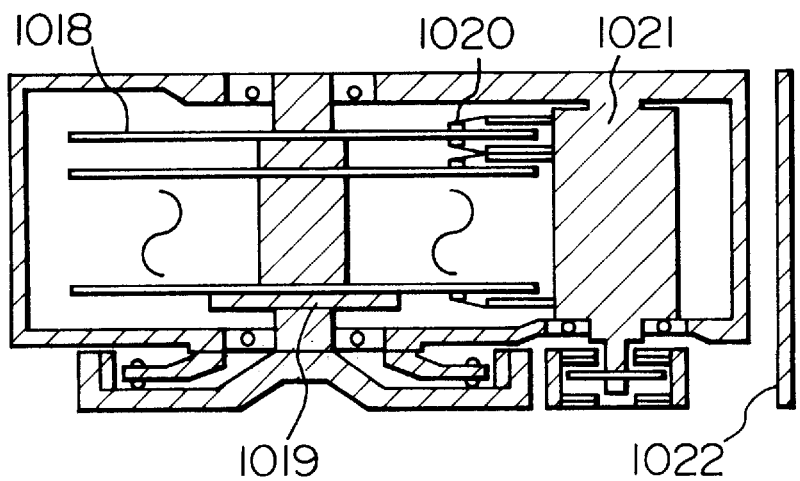

FIG. 13 is an illustration of the construction of an embodiment of the magnetic recording apparatus in accordance with the present invention; FIGS. 13(a) and 13(b) are a plan view and a sectional view of the apparatus, respectively. A magnetic recording apparatus was produced in which four multilayered magnetic recording media were of the seventh and eighth embodiments were assembled. This apparatus was a magnetic storage apparatus constructed as is well known, comprising magnetic recording media 1018, a section 1019 for driving this medium, magnetic heads 1020, a means 1021 for driving the magnetic heads, and read and write signal processing means 1022 for the magnetic head 1020. In this magnetic storage apparatus, the magnetic recording media 1018 were formed of the multilayered magnetic recording media of the seventh and eighth embodiments. A magnetic head in which a recording inductive thin-film head and a reading magnetoresistive head were combined was used as the magnetic head 1020 so that an apparatus is formed. The half-output recording density was increased by approximately 30% more than that in a magnetic storage apparatus formed of conventional well-known multilayered magnetic recording media, in which the intermediate layer 1014 of this embodiment was replaced with Cr. As a result, a large capacity 1.3 times greater than that of the conventional media was achieved. In this embodiment, in particular, media noise was low. Therefore, since a magnetoresistive head was used as a reading head instead of an inductive head, a larger capacity than in the conventional art was realized.

It is possible to read and write information of 600 Mb per 1 inch square at a head flying height of 70 nm as a result of performing signal processing on input and output signals from the magnetic head. Furthermore, the use of the magnetic recording media of the present invention makes it possible to prolong the service life of the apparatus and to achieve 150,000 hours of mean time between failures (MTBF). When the recording-density was set at 300 Mb per 1 inch square, reading and writing was achieved at a head flying height of 110 nm, and 300,000 hours of mean time between failures (MTBF) can be achieved.

[Tenth Embodiment]

Figure 14:
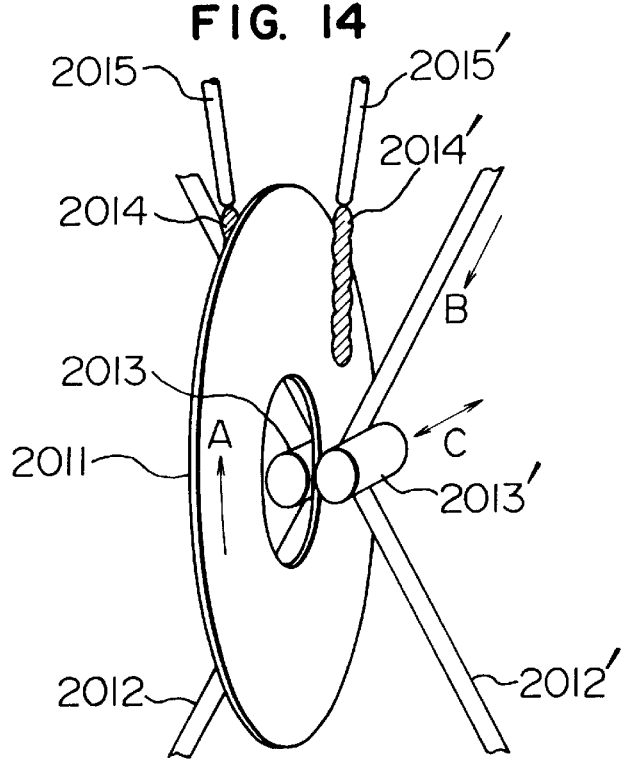
FIG. 14 is an illustration of a polishing apparatus in accordance with the embodiment of the present invention.

FIG. 14 is an illustration of a polishing apparatus in accordance with the tenth embodiment of the present invention.

Polishing cloths 2012 and 2012' are pressed against the front and rear surfaces of a non-magnetic substrate 2011 rotating in the direction of the arrow A at 100 to 1,000 rpm by pressing rollers 2013 and 2013' at a force of 0.1 to 10 kgf. The polishing cloths 2012 and 2012' are moved in the direction of the arrow B at a speed of 0.01 to 10 cm/sec, and a new polishing cloth is supplied to the surface of the substrate. At the same time, the polishing cloths 2012 and 2012' reciprocates in the direction of the arrow C, and thus the entire surface of the substrate can be polished. Abrasive grains 2014 and 2014' are supplied to the surface of the substrate and between the polishing cloths via nozzles 2015 and 2015'.

This embodiment will be explained below. The polishing cloths 2012 and 2012' formed of polyester cloth were pressed against the front and rear surfaces of the NiP-plated Al—Mg alloy substrate 1011 of 130 mm in diameter rotating at 500 rpm in the direction of the arrow A, by polyurethane pressure-applying rollers 2013 and 2013' at a force of 2.5 kgf. While slurry composite abrasive grains 2014 and 2014' in which 10 wt. % of diamond having an average grain size of 1 $\mu$m and 90 wt. % of CeO2 having an average grain size of 0.1 $\mu$m were dispersed in a hydrophilic solvent were being supplied between each surface of the substrate and each of the polishing cloths via the nozzles 2015 and 2015', the polishing cloths 2012 and 2012' were moved at a speed of 1 cm/sec in the direction of the arrow B, and reciprocated three times in the direction of the arrow C in order to polish the entire surface of the substrate, so that a substrate for a magnetic disk was formed. Scars formed on the substrate were substantially parallel to the circumference of the substrate.

Figure 15:
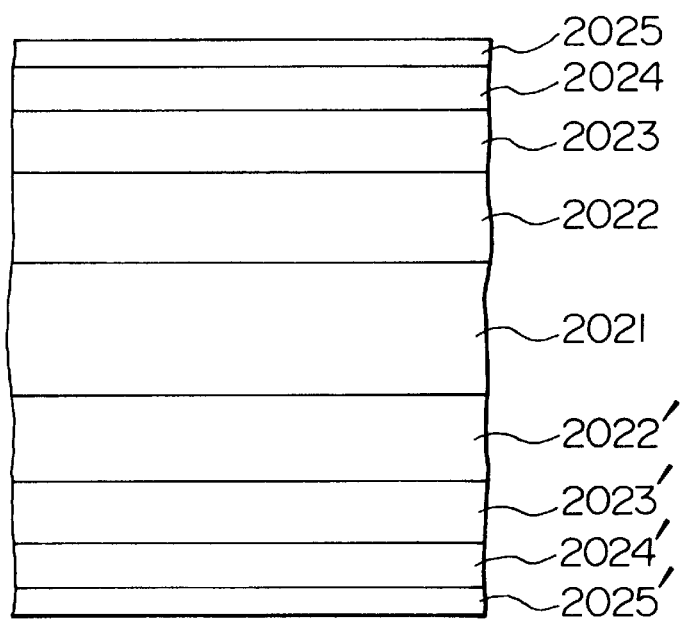
FIG. 15 is a sectional view of the magnetic recording medium in accordance with the embodiment of the present invention.

Next, a magnetic recording medium having the construction shown in FIG. 15 was formed by using the obtained substrate for a magnetic disk. More specifically, Cr underlayers 2022 and 2022' of 50 nm thick, and $Co_{0.87}Cr_{0.10}Ta_{0.03}$ magnetic layers 2023 and 2023' of 50 nm thick, were formed on the non-magnetic substrate 21 by a DC magnetron sputtering method under the conditions of the substrate temperature of 250° C., an argon pressure of 1 mTorr, and a supplied power of 3 W/cm. Thereafter, C protective coating layers 2024 and 2024' were formed to have a thickness of 30 nm by a DC magnetron sputtering method under the conditions of the substrate temperature of 250° C., an argon pressure of 5 mTorr, and a supplied power of 10 W/cm$^2$. On the terminal surfaces there were provided perfluoroalkyl-polyether lubricant layers 2025, 2025' having adsorptive radical including OH radical and having a thickness of 5 nm, and thus a magnetic recording medium was formed.

[Eleventh Embodiment]

Next, still another embodiment will be explained with reference to an illustration of the polishing apparatus shown in FIG. 14.

The polishing cloths 2012 and 2012' formed of polyamide cloth were pressed against the front and rear surfaces of an amorphous carbon substrate 2011 of 95 mm in diameter which was rotated at 600 rpm opposite to the direction of the arrow A by polyurethane pressing rollers 2013 and 2013' at a force of 2 kgf. While the slurry composite abrasive grains 2014 and 2014' in which 15 wt. % of diamond having an average grain size of 0.75 $\mu$m and 85 wt. % of $Cr_2O_3$ having an average grain size of 0.25 $\mu$m were dispersed in a hydrophilic solvent were being supplied between each surface of the substrate and each of the polishing cloths via the nozzles 2015 and 2015', the polishing cloths 2012 and 2012' were moved at a speed of 0.5 cm/sec in the direction of the arrow B, and reciprocated three times in the direction of the arrow C in order to polish the entire surface of the substrate, so that a substrate for a magnetic disk was formed. Scars formed on the substrate were substantially parallel to the circumference of the substrate.

Next, the magnetic recording medium having the structure shown in FIG. 15 was formed by using the obtained substrate for a magnetic disk under the same conditions as in the tenth embodiment.

[Twelfth Embodiment]

Next, still another embodiment will be explained with reference to the illustration of the polishing apparatus shown in FIG. 14.

The polishing cloths 2012 and 2012' formed of cellulose cloth were pressed against the front and rear surfaces of a titanium alloy substrate 11 of 65 mm in diameter which was rotated at 600 rpm in the direction of the arrow A by the polyurethane pressing rollers 2013 and 2013' at a force of 2 kgf. While the slurry composite abrasive grains 2014 and 2014' in which 10 wt. % of diamond having an average grain size of 0.75 $\mu$m, 5 wt. % of $Al_2O_3$ having an average grain size of 0.25 $\mu$m, 45 wt. % of $CeO_2$ having an average grain size of 0.25 $\mu$m, and 40 wt. % of SiO2 having an average grain size of 0.1 $\mu$m were dispersed in a hydrophilic solvent were being supplied between each surface of the substrate and each of the polishing cloths via the nozzles 2015 and 2015', the polishing cloths 2012 and 2012' were moved at a speed of 0.5 cm/sec in the direction of the arrow B, and were reciprocated four times in the direction of the arrow C in order to polish the entire surface of the substrate, so that a substrate for a magnetic disk was formed. Scars formed on the substrate were substantially parallel to the circumference of the substrate.

Next, the magnetic recording medium having the structure shown in FIG. 15 was formed by using the obtained substrate for a magnetic disk under the same conditions as in the tenth embodiment.

[Thirteenth Embodiment]

Next, still another embodiment will be explained with reference to the illustration of the polishing apparatus shown in FIG. 14.

The polishing cloths 2012 and 2012' formed of polyester cloth were pressed against the front and rear surfaces of an NiP-plated Al—Mg alloy substrate 11 of 130- mm in diameter which was rotated at 50 rpm in the direction of the arrow A by the polyester pressing rollers 2013 and 2013' at a force of 2.5 kgf. While the slurry composite abrasive grains 2014 and 2014' in which 10 wt. % of diamond having an average grain size of 1 $\mu$m and 90 wt. % of $CeO_2$ having an average grain size of 0.1 $\mu$m were dispersed in a hydrophilic solvent were being supplied between each surface of the substrate and each of the polishing cloths via the nozzles 2015 and 2015', the polishing cloths 2012 and 2012' were moved at a speed of 100 cm/sec in the direction of the arrow B, and were reciprocated 50 times in the direction of the arrow C in order to polish the entire surface of the substrate, so that a substrate for a magnetic disk was formed. Scars formed on the substrate made approximately 15 degrees with respect to the circumference of the substrate.

Next, the magnetic recording medium having the structure shown in FIG. 15 was formed by using the obtained substrate for a magnetic disk under the same conditions as in the tenth embodiment.

[Fourteenth Embodiment]

Next, still another embodiment will be explained with reference to the illustration of the polishing apparatus shown in FIG. 14.

The polishing cloths 2012 and 2012' formed of polyester cloth were pressed against the front and rear surfaces of an NiP-plated Al—Mg alloy substrate 11 of 48 mm in diameter which was rotated at 500 rpm in the direction of the arrow A by the polyurethane pressing rollers 2013 and 2013, at a force of 2.5 kgf. While the slurry composite abrasive grains 2014 and 2014' in which 10 wt. % of diamond having an average grain size of 1 $\mu$m, and 90 wt. % of CeO2 having an average grain size of 0.1 $\mu$m were dispersed in a hydrophilic solvent are being supplied between each surface of the substrate and each of the polishing cloths via the nozzles 2015 and 2015', the polishing cloths 2012 and 2012' were moved at-a speed of 1 cm/sec in the direction of the arrow B, and were reciprocated 3 times in the direction of the arrow C in order to polish the entire surface of the substrate, so that a substrate for a magnetic disk was formed. Scars formed on the substrate were substantially parallel to the circumference of the substrate.

Next, the magnetic recording medium having the structure shown in FIG. 15 was formed by using the obtained substrate for a magnetic disk. More specifically, Cr underlayers 2022 and 2022' of 50 nm thick, and $Co_{0.87}Cr_{0.10}Ta_{0.03}$ magnetic layers 2023 and 2023' of 50 nm thick, were formed on the non-magnetic substrate 2021 by a DC magnetron sputtering method under the conditions of the substrate temperature of 250° C., an argon pressure of 1 mTorr, and a supplied power of 3 W/cm$^2$. Thereafter, C protective coating layers 2024 and 2024' were formed to have a thickness of 30 nm by a DC magnetron sputtering method under the conditions of the substrate temperature of 250° C., an argon pressure of 5 mTorr, and a supplied power of 10 W/cm$^2$. Next, by using teflon particles whose average grain size was 3 $\mu$m as masks, the C protective coating layers 2024 and 2024' were etched 10 nm by oxygen plasma to form isolated projections. Finally, on the terminal surfaces, there were provided perfluoroalkyl-polyether lubricant layers having adsorptive radicals including OH radical and having a thickness of 5 nm, and thus a magnetic recording medium was formed.

[Fifteenth Embodiment]

Next, still another embodiment will be explained with reference to the illustration of the polishing apparatus shown in FIG. 14.

The polishing cloths 2012 and 2012' formed of cellulose cloth were pressed against the front and rear surfaces of an NiP-plated Al—Mg alloy substrate 11 of 34 mm in diameter which was rotated at 550 rpm opposite to the direction of the arrow A by the polyurethane pressing rollers 2013 and 2013' at a force of 1.8 kgf. While the slurry composite abrasive grains 2014 and 2014' in which 20 wt. % of diamond having an average grain size of 075 $\mu$m, 50 wt. % of CeO2 having an average grain size of 0.25 $\mu$m, and 30 wt. % of $SiO_2$ were dispersed in a lipophilic solvent were being supplied between each of the surface of the substrate and each of the polishing cloths via the nozzles 2015 and 2015', the polishing cloths 2012 and 2012' were moved at a speed of 0.5 cm/sec in the direction of the arrow B,, and were reciprocated 4 times in the direction of the arrow C in order to polish the entire surface of the substrate, so that a substrate for a magnetic disk was formed. Scars formed on the substrate were substantially parallel to the circumference of the substrate.

Figure 16:
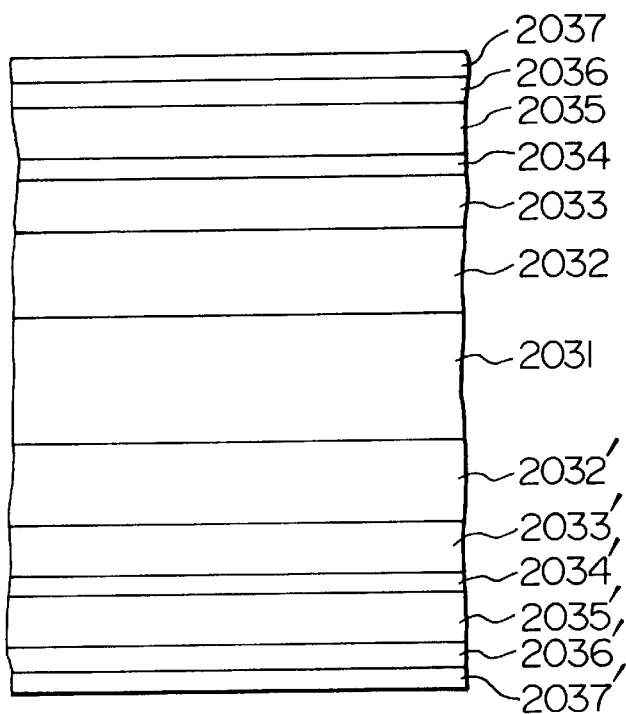
FIG. 16 is a sectional view of the magnetic recording medium in accordance with the embodiment of the present invention.

Next, a magnetic recording medium having the structure shown in FIG. 16 was formed by using the obtained substrate for a magnetic disk. More specifically, Cr underlayers 2032 and 2032' of 50 nm thick, $Co_{0.88}Cr_{0.10}Ta_{0.03}$ first magnetic layers 2033 and 2033' of 15 nm thick, Cr intermediate layers 2034 and 2034' of 5 nm thick, and $Co_{0.87}Cr_{0.10}Ta_{0.03}$ second magnetic layers 2035 and 2035' of 15 nm thick, were formed on a non-magnetic substrate 2031 by a DC magnetron sputtering method under the conditions of the substrate temperature of 250° C., an argon pressure of 1 mTorr, and a supplied power of 3 W/cm$^2$. Thereafter, C protective coating layers 2036 and 2036' were formed to have a thickness of 30 nm by a DC magnetron sputtering method under the conditions of the substrate temperature of 250° C., an argon pressure of 5 mTorr, and a supplied power of 10 W/cm$^2$. On the terminal surfaces, perfluoroalkyl-polyether lubricant layers 2037 and 2037' having adsorptive groups including OH groups were provided to have a thickness of 5 nm, and thus a magnetic recording medium was formed.

COMPARATIVE EXAMPLE 1

Next, a comparative example will be explained with reference to the illustration of the polishing apparatus shown in FIG. 14.

The polishing cloths 2012 and 2012' formed of polyester cloth were pressed against the front and rear surfaces of an NiP-plated Al—Mg alloy substrate 11 of 130 mm in diameter which was rotated at 500 rpm in the direction of the arrow A by the polyurethane pressing rollers 2013 and 2013' at a force of 2.5 kgf. While the slurry composite abrasive grains 2014 and 2014' in which diamond having an average grain size of 0.2 $\mu$m was dispersed in a hydrophilic solvent were being supplied between each surface of the substrate and each of the polishing cloths via the nozzles 2015 and 2015', the polishing cloths 2012 and 2012' were moved at a speed of 1 cm/sec in the direction of the arrow B, and were reciprocated 3 times in the direction of the arrow C in order to polish the entire surface of the substrate, so that a substrate for a magnetic disk was formed.

Next, a magnetic recording medium having the structure shown in FIG. 15 was formed by using the obtained substrate for a magnetic disk under the same conditions as in the tenth embodiment.

COMPARATIVE EXAMPLE 2

Next, a comparative example will be explained with reference to the illustration of the polishing apparatus shown in FIG. 14.

The polishing cloths 2012 and 2012' formed of polyester cloth were pressed against the front and rear surfaces of a NiP-plated Al—Mg alloy substrate 2011 of 130 mm in diameter which was rotated at 500 rpm in the direction of the arrow A by the polyurethane pressing rollers 2013 and 2013' at a force of 2.5 kgf. While the slurry composite abrasive grains 2014 and 2014' in which diamond having an average grain size of 3 $\mu$m was dispersed in a hydrophilic solvent were being supplied between each surface of the substrate and each of the polishing cloths via the nozzles 2015 and 2015', the polishing cloths 2012 and 2012' were moved at a speed of 1 cm/sec in the direction of the arrow B, and were reciprocated 3 times in the direction of the arrow C in order to polish the entire surface of the substrate, so that a substrate for a magnetic disk was formed.

Next, a magnetic recording medium having the structure shown in FIG. 15 was formed by using the obtained substrate for a magnetic disk under the same conditions as in the tenth embodiment.

[Sixteenth Embodiment]

Next, the surface roughness of the magnetic recording media of the above-described tenth of fifteenth embodiments, and comparative examples 1 and 2 were measured by a scanning tunnel microscope (STM) and a needle touch-type surface profiler, and waveforms were Fourier-analyzed. The values of wavelengths at which the wavelength spectrum became maximum in each magnetic recording medium in which the wavelength was from 1 nm to 200 μm are shown in Table 2.

TABLE 2

|  | Wavelengths at the maximum peaks of wavelength spectrum |
| --- | --- |
| Tenth Embodiment | 30 nm, 1.1 μm |
| Eleventh Embodiment | 41 nm, 0.62 μm |
| Twelfth Embodiment | 24 nm, 0.90 μm |
| Thirteenth Embodiment | 33 nm, 1.5 μm |
| Fourteenth Embodiment | 33 nm, 1.5 μm, 12 μm |
| Fifteenth Embodiment | 19 nm, 0.86 μm |
| Comparative Example 1 | 39 nm |
| Comparative Example 2 | 3.7 μm |

As shown in Table 2, the magnetic recording media of the tenth to fifteenth embodiments had a plurality of maximum values in the region of wavelengths from 1 nm to 200 μm, while the magnetic recording media of comparative examples 1 and 2 had only one maximum value in the region of wavelengths from 1 nm to 200 μm.

Figure 17:
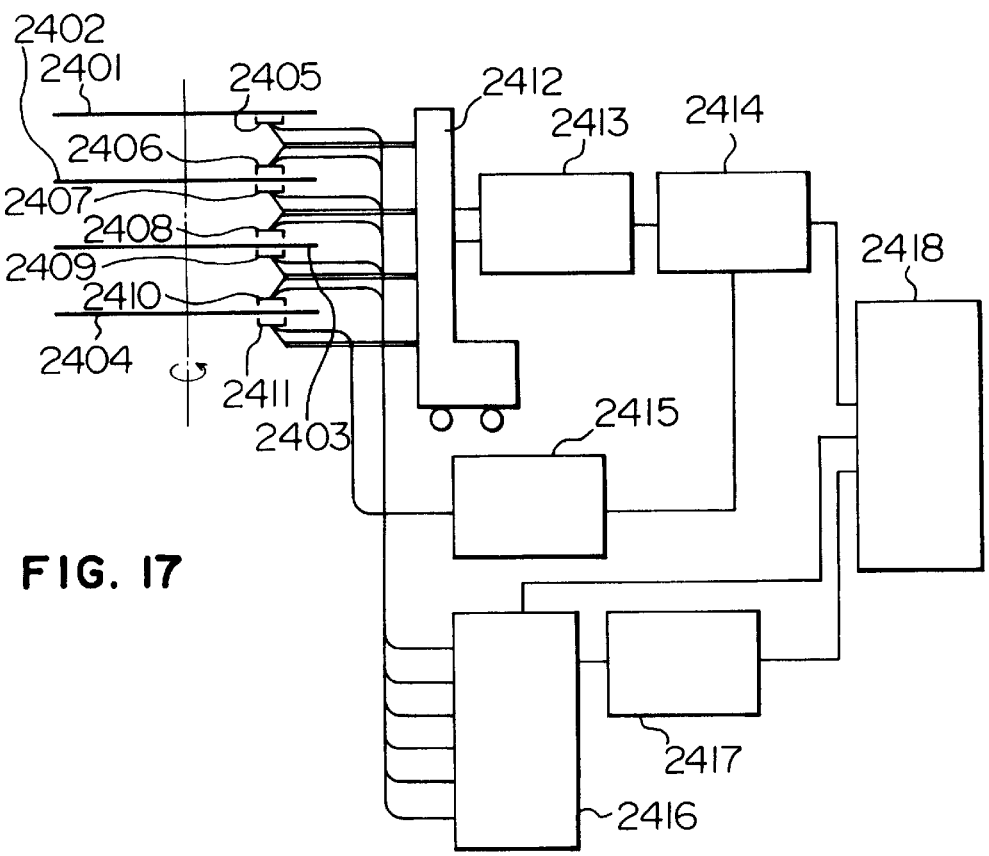
FIG. 17 is a block diagram of the magnetic recording apparatus in accordance with the embodiment of the present invention.

Further, as for the magnetic recording media of the tenth to fifteenth embodiments and Comparative Examples 1 and 2, thin film magnetic heads in which a NiFe alloy used as a pole material and a non-magnetic material of zirconia used as the principal constituent for the core section were combined to form a magnetic recording apparatus shown in FIG. 17. Read and write characteristics and CSS characteristics were evaluated.

Figure 4:
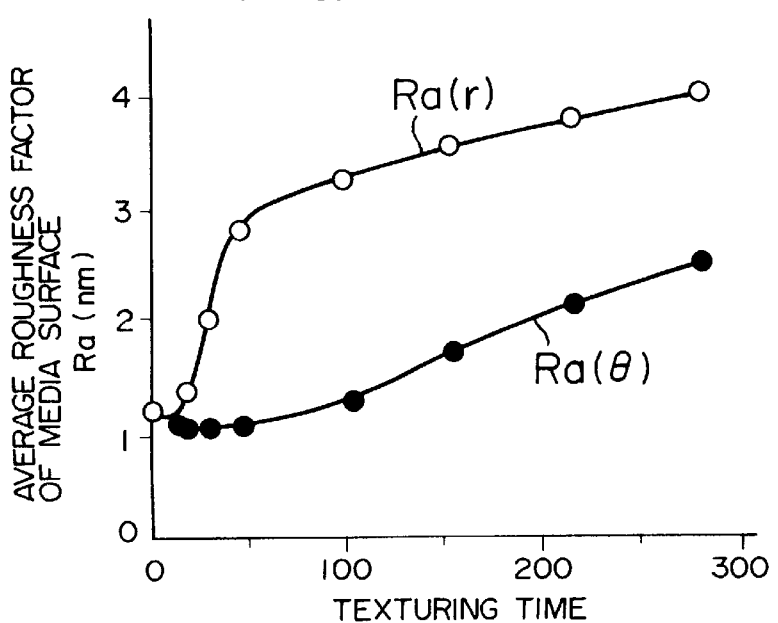
FIG. 4 illustrates the relationship between the texturing period of time and the average roughness factor of media in accordance with the embodiment of the present invention.

In FIG. 4, reference numerals 2401, 2402, 2403 and 2404 denote magnetic recording media of the present invention; reference numerals 2405, 2406, 2407, 2408, 2409, 2410 and 2411 denote magnetic heads; reference numeral 2412 denotes a movable head arm; reference numeral 2413 denotes a voice coil motor; reference numeral 2414 denotes a control circuit; reference numeral 2415 denotes a positioning detecting circuit; reference numeral 2416 denotes a head selecting switch; reference numeral 2417 denotes a read and write circuit; and reference numeral 2418 denotes a controller. As for read and write characteristics, were used S/N value obtained when signals of 65 k FCI were read and written, and the maximum surface recording density at which S/N of 25 dB or more was possible; as for CSS characteristics, there were used the coefficient of friction between the magnetic head and the magnetic recording media when 10,00 CSS were performed, and the number of CSSs until a failure occurs. The results are shown in Table 3.

TABLE 3

|  | S/N (dB) | Recording density (Mb/in²) | Coefficient of friction | Number of CSSs performed |
| --- | --- | --- | --- | --- |
| Tenth Embodiment | 33 | 430 | 0.28 | 100,000 or more |
| Eleventh Embodiment | 30 | 380 | 0.33 | 100,000 or more |
| Twelfth Embodiment | 35 | 500 | 0.31 | 100,000 or more |
| Thirteenth Embodiment | 32 | 400 | 0.25 | 100,000 or more |
| Fourteenth Embodiment | 32 | 400 | 0.21 | 100,000 or more |
| Fifteenth Embodiment | 39 | 650 | 0.32 | 100,000 or more |
| Comparative Example 1 | 28 | 350 | 0.73 | 13,000 |
| Comparative Example 2 | 19 | 150 | 0.41 | 70,000 |

As shown in Table 3, the magnetic recording media of the tenth to fifteenth embodiments had high read and write characteristics and high CSS characteristics. It is clear that the magnetic recording media of the tenth to fifteenth embodiments were far superior to those of Comparative Examples 1 and 2.

[Seventeenth Embodiment]

Next, as for the magnetic recording media of the tenth to Fifteenth Embodiments and Comparative Examples 1 and 2, magnetic heads in which both a magnetoresistive sensor provided in the read section and a non-magnetic material containing alumina titanium carbide used as the principal constituent for the core section were combined to form a magnetic recording apparatus shown in FIG. 17. Read and write characteristics and CSSs characteristics were evaluated in the same way as in the Sixteenth Embodiment.

TABLE 4

|  | S/N (dB) | Recording density (Mb/in²) | Coefficient of friction | Number of CSSs performed |
| --- | --- | --- | --- | --- |
| Tenth Embodiment | 38 | 630 | 0.27 | 100,000 or more |
| Eleventh Embodiment | 34 | 480 | 0.32 | 100,000 or more |
| Twelfth Embodiment | 41 | 670 | 0.32 | 100,000 or more |
| Thirteenth Embodiment | 37 | 600 | 0.24 | 100,000 or more |
| Fourteenth Embodiment | 37 | 600 | 0.20 | 100,000 or more |
| Fifteenth Embodiment | 45 | 800 | 0.33 | 100,000 or more |
| Comparative Example 1 | 31 | 400 | 0.74 | 11,000 |
| Comparative Example 2 | 22 | 200 | 0.40 | 75,000 |

As shown in Table 4, the magnetic recording media of the Tenth of Fifteenth Embodiments has high read and write characteristics and high CSS characteristics. It is clear that the magnetic recording media of the tenth to fifteenth embodiments were far superior to those of Comparative Examples 1 and 2.

Since the magnetic head flies stably in the combination of the magnetic recording media of the Tenth to Fifteenth Embodiments with the read and write separated type magnetic head having a magnetoresistive sensor provided in the write section, abnormal discharge was significantly suppressed when an electric current was supplied to the magnetic head. Therefore, a highly reliable magnetic recording apparatus was provided. The provision of a layer of C, ZrO$_2$, Al$_2$O$_3$, or the like on the surface of the magnetoresistive sensor made it possible to preferably improve the reliability of the apparatus. In particular, if the magnetic head was combined with a magnetic recording medium including a plurality of magnetic layers, a high S/N of the apparatus could be preferably obtained.

Any one of the materials commonly known as substrates for a magnetic disk, for example, NiP-plated Al alloy, titanium alloy, strengthened glass, crystallized glass, plastic, amorphous carbon, ceramics, surface glass coat ceramics, or silicon, can be used for the non-magnetic substrate. Either or both of the directions A and B of the rotation of the non-magnetic substrate 11 may be opposite to that shown in this embodiment. The width of the polishing cloth may be smaller than, the same as or greater than the radius of the non-magnetic substrate. It is necessary to use a pressing roller whose width is the same as or smaller than that of the polishing cloth. Although abrasive grains formed of only abrasive materials may be used, abrasive grains dispersed in a hydrophilic or lipophilic solvent so as to be a slurry may be used. Cr, Mo, W, Cr—Ti, Cr—Si, Cr—W, C or the like may be used for the underlayer and the intermediate layer. Co—Ni, Co—Ni—Cr, Co—Ni—Zr, Co—Cr—Pt, Co—Cr, Co—Cr—Ta, Co—Cr—Pt, Co—Cr—Pt—Si, or the like may be used for the magnetic layer. C, carbide, nitride, oxide, boride or the like may be used for the protective coating layer. If any of the above C, carbide, nitride, oxide, or boride are combined, the same effect can be obtained The underlayer, the magnetic layer and the protective coating layer may be formed of plural layers.

According to the present invention, it is possible to provide a magnetic recording medium by which high-density recording is achieved, and to provide a small, large-capacity magnetic recording apparatus.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangement included within the spirit and scope of the claims. The following claims are to be according to broadest interpretation, so as to encompass all such modifications and equivalent structures and functions.

What is claimed is:

1. A magnetic recording medium having at least two magnetic layers and at least one intermediate layer sandwiched between said magnetic layers, wherein said magnetic layers are made of a Co-based alloy and a main constituent of said intermediate layer is one selected from the group consisting of Co Be Si, Ge and Ni—P.

2. A magnetic recording medium according to claim 1, wherein said magnetic layers are made of a Co-based alloy and a main constituent of said intermediate layer is one selected from the group consisting of C, B, Si, Ge and Ni—P.

3. A magnetic recording apparatus, comprising:
a magnetic recording medium, wherein said magnetic recording medium has at least two magnetic layers and at least one intermediate layer sandwiched between said magnetic layers, wherein said magnetic layers are made of a Co-based alloy and a main constituent of said intermediate layer is one selected from the group consisting of C, B, Si, Ge and Ni—P;
a magnetic-recording-medium drive section;
a magnetic head having a magnetoresistive read section;
a magnetic-head drive section; and
a read-and-write signal processing system.

4. A magnetic recording apparatus according to claim 3, wherein said magnetic layers are made of a Co-based alloy and a main constituent of said intermediate layer of the magnetic recording medium is one selected from the group consisting of C, B, Si, Ge, and Ni—P.

5. A magnetic recording medium, comprising:
a non-magnetic disk substrate; and
a magnetic film formed on the non-magnetic disk substrate directly or via an underlayer, a surface average roughness factor Ra(r) on a surface of the medium measured substantially parallel to the radial direction of the disk substrate being in a range from 0.3 nm to 3 nm, and a ratio of the surface average roughness factor Ra(r) to a average roughness Ra(θ) on a surface of the measured substantially along the circumferential direction of the disk substrate, Ra(r)/Ra(θ), being in a range from 1.1 to 3.0, and a coercivity Hc(θ) measured by applying a magnetic field substantially along the radial direction of the disk substrate being greater than another coercivity measured by applying a magnetic field substantially along the circumferential direction of the disk substrate.

6. A magnetic recording apparatus, comprising:
a magnetic recording medium;
a magnetic-recording-medium drive section;
a magnetic head having a magnetoresistive read section;
a magnetic head drive section; and
a read-and-write signal processing system, a surface average roughness factor Ra(r) on a surface of the medium measured substantially parallel to the radial direction of the disk substrate being in a range from 03. nm to 3 nm, and a ratio of the surface average roughness factor Ra(r) to a average roughness factor Ra(θ) on a surface of the measured substantially along the circumferential direction of the disk substrate, Ra(r)/Ra(θ), being in a range from 1.1 to 3.0, and a coercivity Hc(O) measured by applying a magnetic field substantially along the radial direction of the disk substrate being greater than another coercivity measured by applying a magnetic field substantially along the circumferential direction of the disk substrate.

7. A magnetic recording apparatus according to claim 3, wherein said easy magnetization axes of said magnetic layers are substantially parallel to a surface of the magnetic recording medium.

* * * * *

UNITED STATES PATENT AND TRADEMARK OFFICE
CERTIFICATE OF CORRECTION

PATENT NO.       : 6,057,021
APPLICATION NO.  : 08/944472
DATED            : May 2, 2000
INVENTOR(S)      : Ishikawa et al.

It is certified that error appears in the above-identified patent and that said Letters Patent is hereby corrected as shown below:

Column 28, line 16, delete Claim 5, starting with "A magnetic" through line 34, ending with "the disk substrate." and insert the following Claim 5:

--5. A magnetic recording medium, comprising:
  a non-magnetic disk substrate; and
  a magnetic film formed on the non-magnetic disk substrate directly or via an underlayer, a surface average roughness factor $Ra(r)$ on a surface of the medium measured substantially parallel to the radial direction of the disk substrate being in a range from 0.3nm to 3nm, and a ratio of the surface average roughness factor $Ra(r)$ to a average roughness $Ra(\theta)$ on a surface of the measured substantially along the circumferential direction of the disk substrate, $Ra(r)/Ra(\theta)$, being in a range from 1.1 to 3.0, and a coercivity $Hc(\theta)$ measured by applying a magnetic field substantially along the circumferential direction of the disk substrate being greater than another coercivity $Hc(r)$ measured by applying a magnetic field substantially along the radial direction of the disk substrate.--

UNITED STATES PATENT AND TRADEMARK OFFICE
CERTIFICATE OF CORRECTION

PATENT NO. : 6,057,021
APPLICATION NO. : 08/944472
DATED : May 2, 2000
INVENTOR(S) : Ishikawa et al.

It is certified that error appears in the above-identified patent and that said Letters Patent is hereby corrected as shown below:

Column 28, line 35, delete Claim 6, starting with "A magnetic" through line 54, ending with "the disk substrate." and insert the following Claim 6:

--6. A magnetic recording apparatus, comprising:
   a magnetic recording medium;
   a magnetic-recording-medium drive section;
   a magnetic head having a magnetoresistive read section;
   a magnetic head drive section; and
a read-and-write signal processing system, a surface average roughness factor Ra(r) on a surface of the medium measured substantially parallel to the radial direction of the disk substrate being in a range from 03. nm to 3 nm, and a ratio of the surface average roughness factor Ra(r) to a average roughness factor Ra(θ) on a surface of the measured substantially along the circumferential direction of the disk substrate, Ra(r)/Ra(θ), being in a range from 1.1 to 3.0, and a coercivity Hc(θ) measured by applying a magnetic field substantially along the circumferential direction of the disk substrate being greater than another coercivity Hc(r) measured by applying a magnetic field substantially along the radial direction of the disk substrate.--

Signed and Sealed this

First Day of April, 2008

JON W. DUDAS
*Director of the United States Patent and Trademark Office*